US007733558B2

(12) United States Patent
Arai et al.

(10) Patent No.: US 7,733,558 B2
(45) Date of Patent: Jun. 8, 2010

(54) DISPLAY DEVICE WITH AN ADDRESSABLE MOVABLE ELECTRODE

(75) Inventors: Kazuma Arai, Tokyo (JP); Yoshihiro Maeda, Tokyo (JP); Naoya Sugimoto, Tokyo (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 0 days.

(21) Appl. No.: 12/383,620

(22) Filed: Mar. 25, 2009

(65) Prior Publication Data
US 2009/0185085 A1     Jul. 23, 2009

Related U.S. Application Data

(63) Continuation-in-part of application No. 12/004,607, filed on Dec. 24, 2007, which is a continuation-in-part of application No. 11/121,543, filed on May 4, 2005, now Pat. No. 7,268,932, and a continuation-in-part of application No. 10/698,620, filed on Nov. 1, 2003, now abandoned, said application No. 11/121,543 is a continuation-in-part of application No. 10/698,620, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 61/072,322, filed on Mar. 28, 2008, provisional application No. 60/877,237, filed on Dec. 26, 2006.

(51) Int. Cl.
*G02B 26/00* (2006.01)
*G02B 26/08* (2006.01)
*G02F 1/29* (2006.01)

(52) U.S. Cl. .................. 359/290; 359/198; 359/303

(58) Field of Classification Search ......... 359/290–292, 359/295, 223–225, 245, 260–263, 298, 198, 359/301–303, 317–318, 237, 242
See application file for complete search history.

(56) References Cited

U.S. PATENT DOCUMENTS

| 4,229,732 A | 10/1980 | Hartstein et al. |
| 4,969,730 A | 11/1990 | van den Brandt |
| 5,061,049 A | 10/1991 | Hornbeck |
| 5,206,629 A | 4/1993 | W. et al. |
| 5,214,420 A | 5/1993 | Thompson et al. |
| 5,285,407 A | 2/1994 | Gale et al. |
| 5,452,024 A | 9/1995 | Sampsell |
| 5,612,713 A * | 3/1997 | Bhuva et al. ............... 345/84 |
| 5,673,139 A | 9/1997 | Johnson |
| 5,686,939 A | 11/1997 | Millward et al. |
| 6,128,121 A | 10/2000 | Choi et al. |

(Continued)

*Primary Examiner*—Scott J Sugarman
*Assistant Examiner*—Dawayne A Pinkney
(74) *Attorney, Agent, or Firm*—Bo-In Lin

(57) ABSTRACT

A display device implemented with a spatial light modulator (SLM) comprising a plurality of pixel elements arranged in array to modulate incident light and display an image, wherein each of the pixel elements comprises a movable electrode and a stationary electrode; a drive circuit connected to the movable electrode and receives image data for applying a voltage applied to control the movable electrode in accordance with image data, and a voltage application circuit for applying and controlling a voltage applied to the stationary electrode to control a moving speed of the movable electrode.

25 Claims, 38 Drawing Sheets

U.S. PATENT DOCUMENTS

| | | | |
|---|---|---|---|
| 6,388,661 B1 | 5/2002 | Richards et al. |
| 6,552,840 B2 | 4/2003 | Knipe |
| 6,809,977 B1 | 10/2004 | Richards et al. |
| 6,856,447 B2 | 2/2005 | Richards et al. |
| 6,888,521 B1 | 3/2005 | Richards et al. |
| 7,022,249 B2 | 4/2006 | Valette |
| 7,027,205 B2 | 4/2006 | Richards et al. |
| 7,012,592 B2 | 5/2006 | Richards et al. |

\* cited by examiner

FIG. 10A
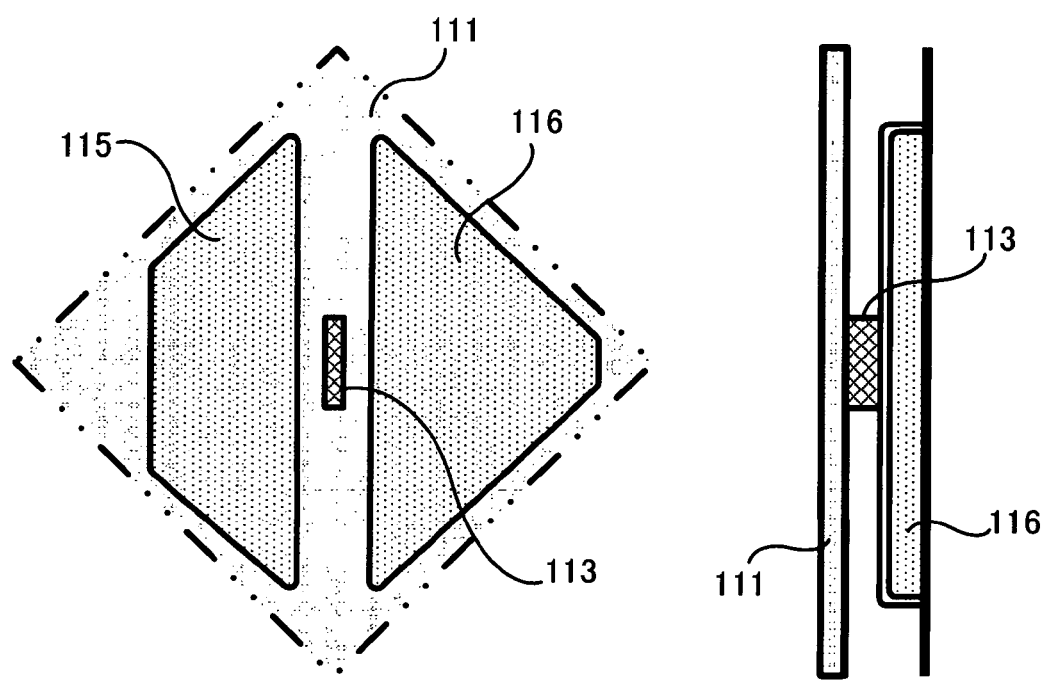
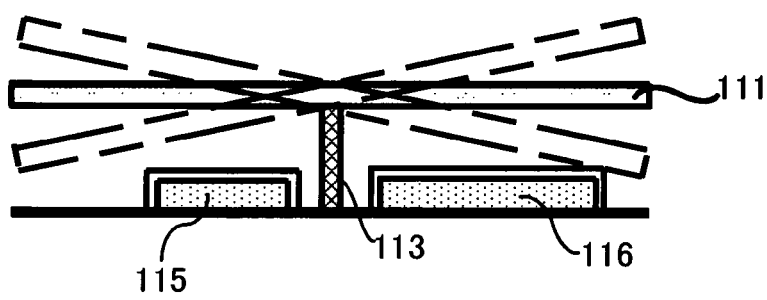
FIG. 10C
FIG. 10B

FIG. 10D
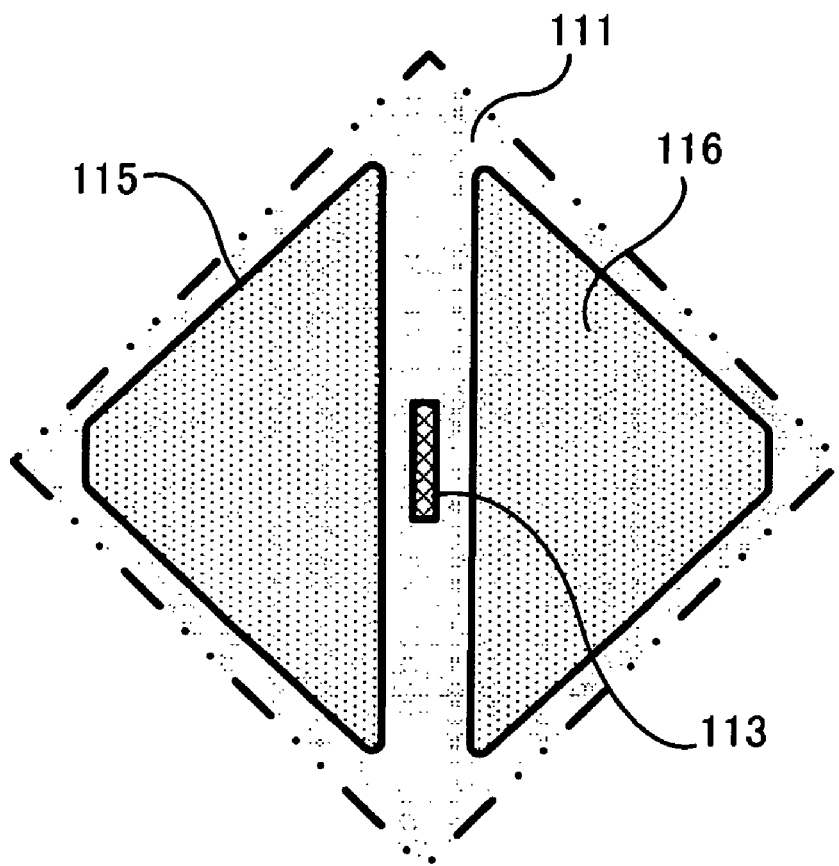
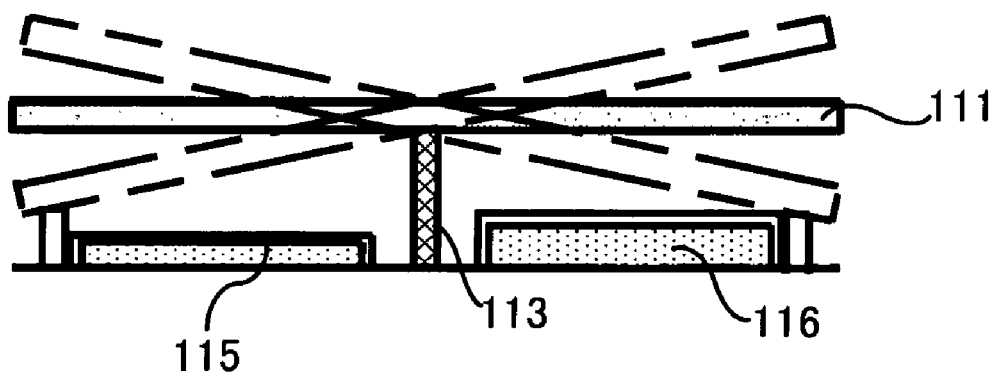
FIG. 10E

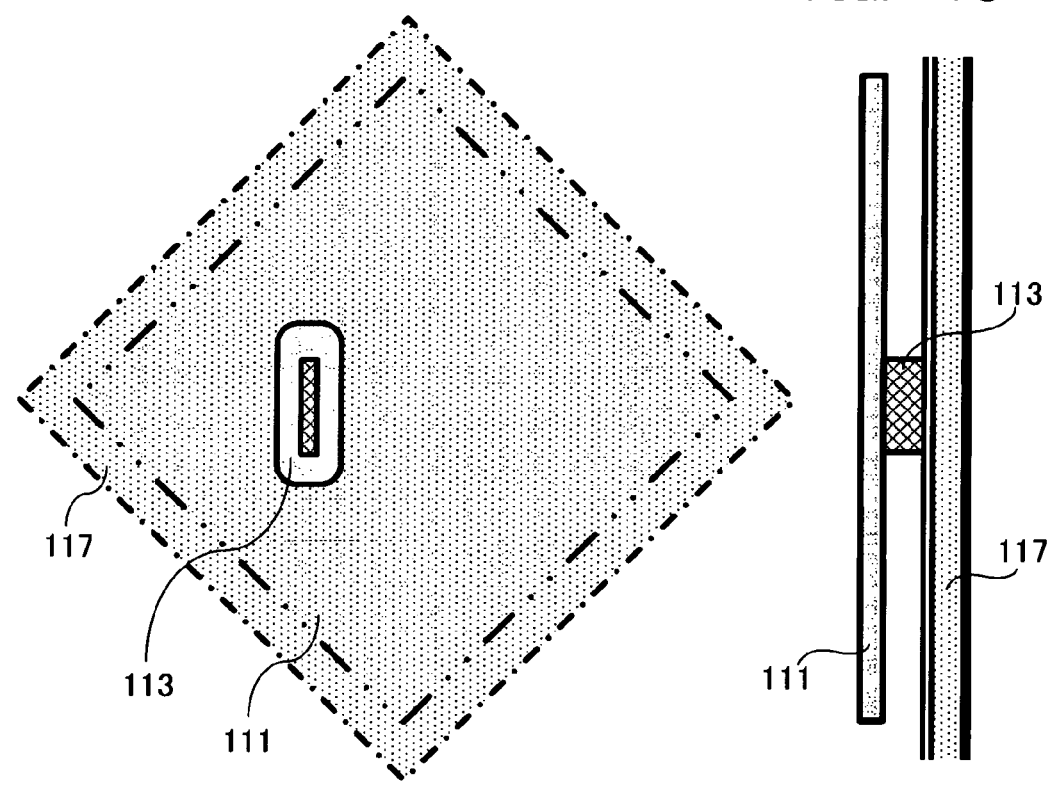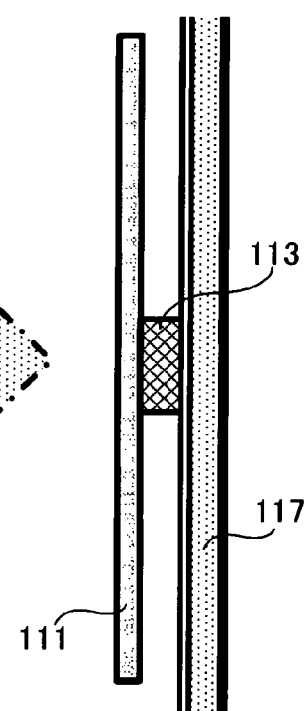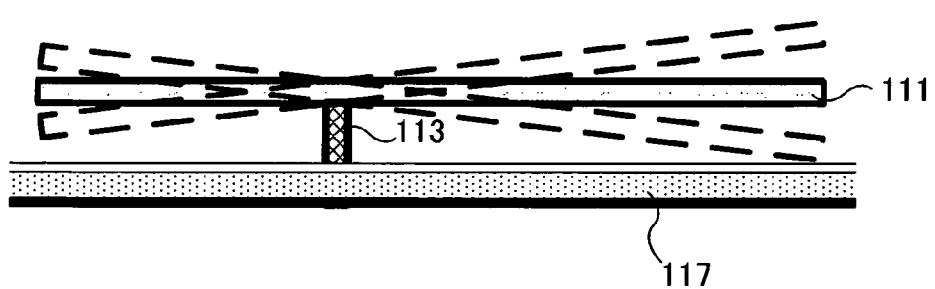

FIG. 19A
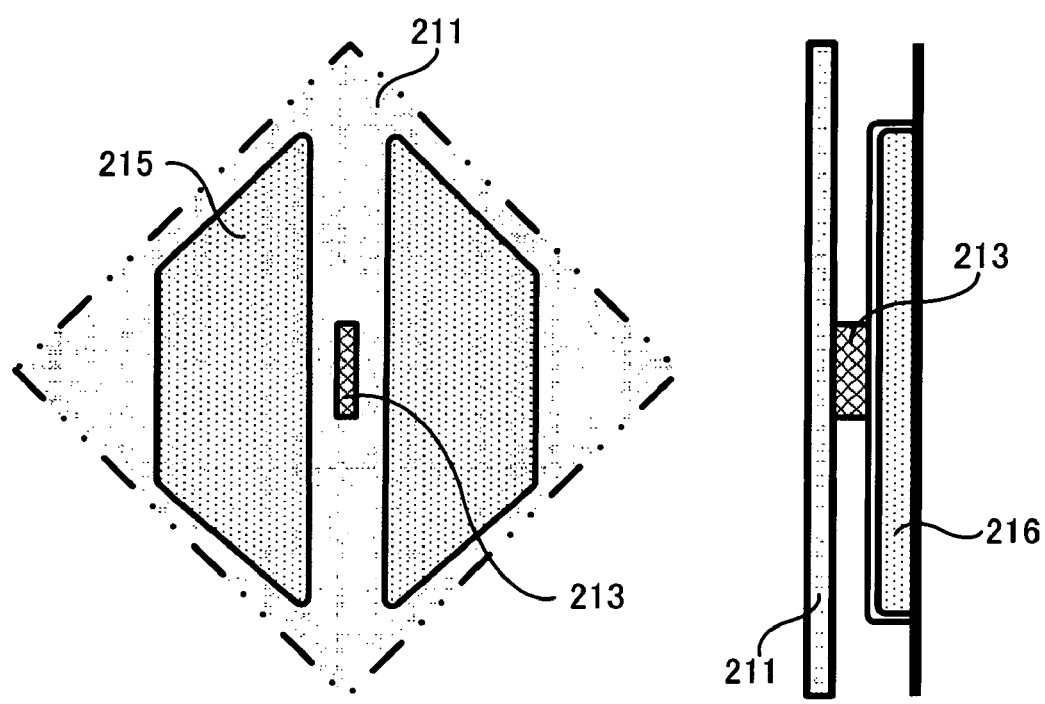
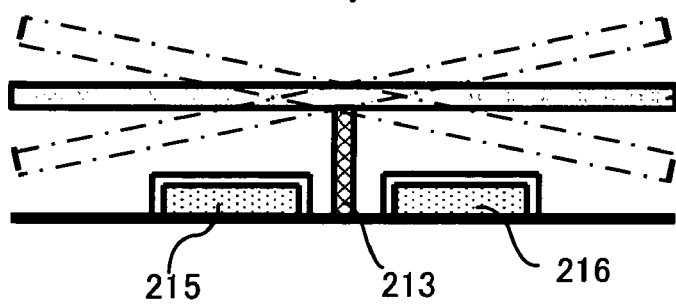
FIG. 19B
FIG. 19C

FIG. 25A
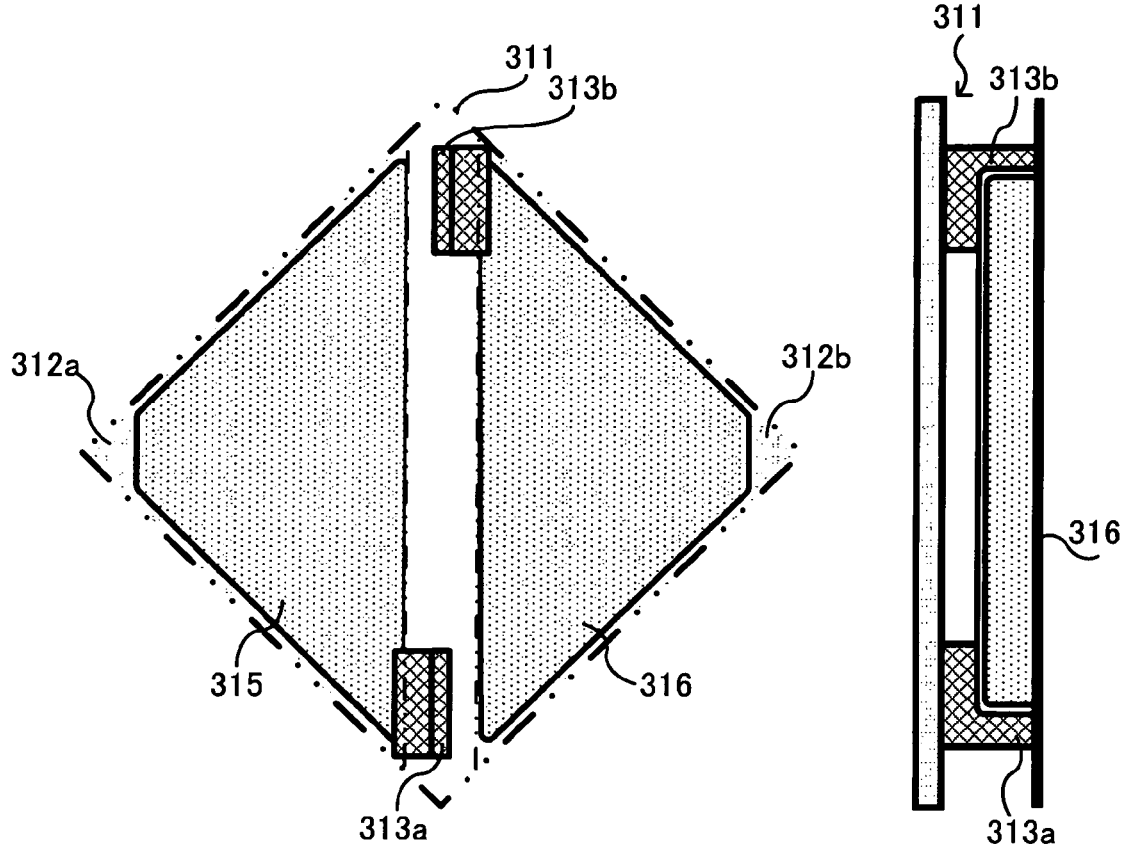
FIG. 25C
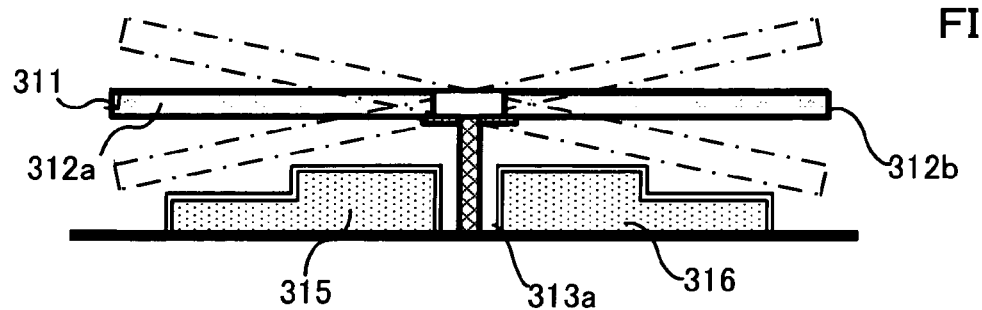
FIG. 25B

FIG. 28A
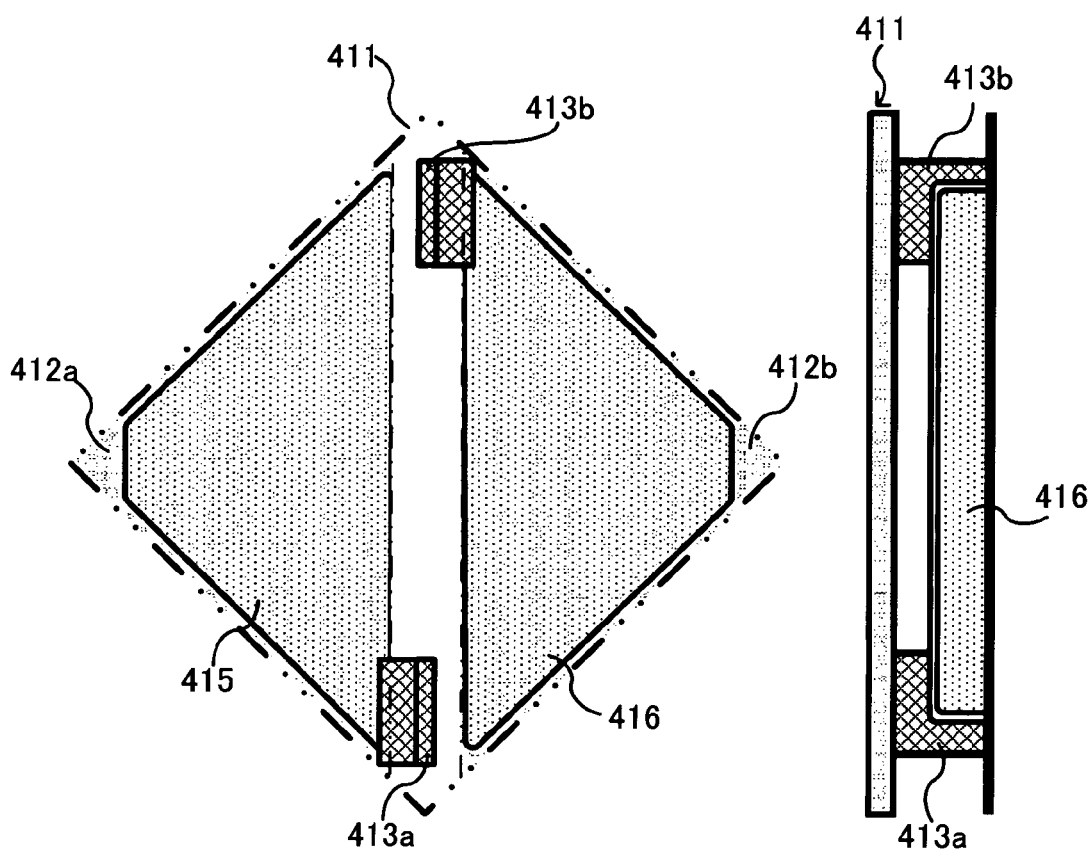
FIG. 28C
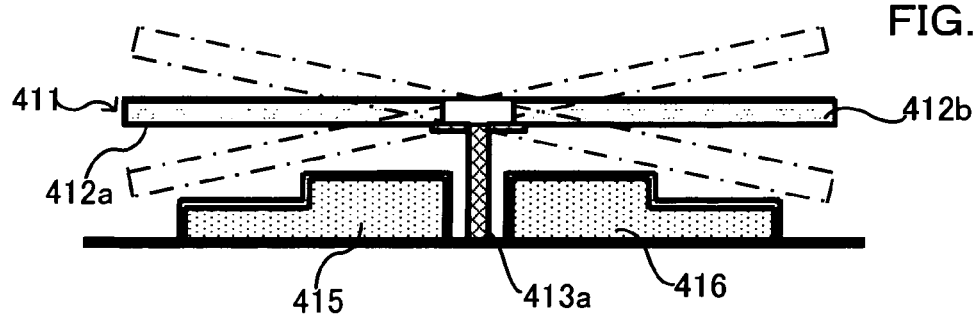
FIG. 28B

DISPLAY DEVICE WITH AN ADDRESSABLE MOVABLE ELECTRODE

CROSS REFERENCE TO RELATED APPLICATIONS

This application is a Non-provisional Application of a Provisional Application 61/072,322 filed on Mar. 28, 2008 and a Continuation in Part Application of another patent application Ser. No. 12/004,607 filed on Dec. 24, 2007. The application Ser. No. 12/004,607 is a Non-provisional Application of a Provisional Application of 60/877,237 filed on Dec. 26, 2006. The application Ser. No. 12/004,607 is further a Continuation in Part (CIP) Application of a Non-provisional patent application Ser. No. 11/121,543 filed on May 4, 2005 issued into U.S. Pat. No. 7,268,932 and another Non-provisional application Ser. No. 10/698,620 filed on Nov. 1, 2003 now abandoned. The application Ser. No. 11/121,543 is a Continuation In Part (CIP) Application of three previously filed Applications. These three Applications are Ser. No. 10/698,620 filed on Nov. 1, 2003; Ser. No. 10/699,140 filed on Nov. 1, 2003, now issued into U.S. Pat. No. 6,862,127; and Ser. No. 10/699,143 filed on Nov. 1, 2003, now issued into U.S. Pat. No. 6,903,860 by the Applicant of this patent applications. The disclosures made in these patent applications are hereby incorporated by reference in this patent application.

BACKGROUND OF THE INVENTION

1. Field of the Invention

The present invention relates generally to a display device. More particularly, this invention relates to a micromirror device with the pixel elements arranged in an array modulating an incident light with the modulation states of pixel elements display image data.

2. Description of the Related Art

After the dominance of CRT technology in the display industry for over 100 years, Flat Panel Displays (hereafter FPD) and Projection Displays have gained popularity because the FDP display implements a more compact image projecting system while projecting images on a larger display screen. Of several types of projection displays, projection displays using micro-displays are gaining recognition among the consumers because of their high picture quality and a lower cost than FPDs. There are two types of micro-displays used for projection displays on the market, i.e., micro-LCDs (Liquid Crystal Displays) and micromirror technology. Because the micromirror devices display images with an un-polarized light, the images projected by the micromirror device have a brightness superior to that of micro-LCDs, which use polarized light.

Even though there have been significant advances made in recent years in technologies implementing an electromechanical mirror device as a spatial light modulator (SLM), there are still limitations and difficulties when it is employed to display a high quality image. Specifically, when the images are digitally controlled, the image quality is adversely affected due to the fact that the images are not displayed with a sufficient number of gray scales.

An electromechanical mirror device implemented as the spatial light modulator (SLM) for an image projection apparatus has recently drawn a considerable amount of popular interest. The electromechanical mirror device commonly employs a relative large number of micromirrors configured as a "mirror array". In general, the number of mirror elements ranges from 60,000 to several millions, placed on the surface of a substrate in an electromechanical mirror device.

Referring to FIG. 1A, an image display system 1 including a screen 2 is disclosed in a relevant U.S. Pat. No. 5,214,420. A light source 10 is used to generate light beams to project illumination for the display images on the display screen 2. The light 9 projected from the light source is further concentrated and directed toward lens 12 by way of mirror 11. Lenses 12, 13 and 14 form a beam columnator operative to columnate the light 9 into a column of light 8. A spatial light modulator 15 is controlled by a computer 19 through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

The on-and-off states of the micromirror control scheme, as that implemented in the U.S. Pat. No. 5,214,420 and in most conventional display systems, impose a limitation on the quality of the display. Specifically, applying the conventional configuration of a control circuit limits the gray scale gradations produced in a conventional system (PWM between ON and OFF states), limited by the LSB (least significant bit, or the least pulse width). Due to the ON-OFF states implemented in the conventional systems, there is no way of providing a shorter pulse width than the duration represented by the LSB. The least quantity of light, which determines the gray scale, is the light reflected during the least pulse width. The limited levels of the gray scale lead to a degradation of the display image.

Specifically, FIG. 1C is a schematic circuit diagram to illustrate a control circuit implemented in a mirror element for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads in the memory cell 32. The memory cell 32 includes an access switch transistor M9 and a latch 32a based on a Static Random Access Memory (SRAM) switch design. All access transistors M9 on a Row line receive a DATA signal from a different Bit-line 31a. The particular memory cell 32 is accessed for writing a bit to the cell by turning on the appropriate row select transistor M9, using the ROW signal functioning as a Word-line. Latch 32a consists of two cross-coupled inverters, M5/M6 and M7/M8, which permit two stable states that include a state 1 when is Node A high and Node B low, and a state 2 when Node A is low and Node B is high.

The control circuit positions the micro-mirrors to be at either an ON or an OFF angular orientation, as that shown in FIG. 1A. The brightness, i.e., the number of gray scales of display for a digitally control image system, is determined by the length of time the micro-mirror stays at an ON position. The length of time a micromirror is in an ON position is controlled by a multiple bit word. FIG. 1D shows the "binary time intervals" when controlling micromirrors with a four-bit word. As shown in FIG. 1D, the time durations have relative values of 1, 2, 4, 8, which in turn define the relative brightness for each of the four bits where "1" is the least significant bit and "8" is the most significant bit. According to the control mechanism as shown, the minimum controllable differences between gray scales for showing different levels of brightness is a represented by the "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds.

Having established these times for each pixel of each frame, pixel intensities are quantified such that black is a 0 time period, the intensity level represented by the LSB is 1 time period, and the maximum brightness is $2^n-1$ time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analog levels of light.

For controlling deflectable mirror devices, the PWM applies data to be formatted into "bit-planes", with each bit-plane corresponding to a bit weight of the intensity of light. Thus, if the brightness of each pixel is represented by an n-bit value, each frame of data has the n-bit-planes. Then, each bit-plane has a 0 or 1 value for each mirror element. According to the PWM control scheme described in the preceding paragraphs, each bit-plane is independently loaded and the mirror elements are controlled according to bit-plane values corresponding to the value of each bit during one frame. Specifically, the bit-plane according to the LSB of each pixel is displayed for 1 time period.

FIG. 2 is an outline diagram showing the cross-section of a conventional mirror element.

As shown in FIG. 2, a plurality of pixel elements 610 is arrayed in a grid at each of the positions where vertically extended bit lines 621 and horizontally extended word lines 631 cross each other.

Each pixel element 610 comprises a mirror 611, which tilts freely, supported by a substrate (not shown in a drawing herein) by way of a hinge 613.

On the substrate, an ON electrode 615 and an OFF electrode 616 are symmetrically placed at positions sandwiching the hinge 613 between them.

The ON electrode 615, when a predetermined electric potential (noted simply as "potential" hereinafter) is applied thereto, attracts mirror 611 with a coulomb force and tilts it to a position abutting a stopper (not shown in a drawing herein). This causes incident light incident to the mirror 611 to be reflected to the light path of an ON position, which matches the optical axis of a projection optical system (not shown in a drawing herein).

The OFF electrode 616, when a predetermined potential is applied thereto, attracts mirror 611 with a coulomb force and tilts it to a position abutting a stopper equipped on the OFF side. This causes incident light incident to the mirror 611 to be reflected to the light path of an OFF position that is shifted from the optical axis of the above described projection optical system.

An ON capacitor 615a is connected to the ON electrode 615; it is also connected to a bit line 621-1 by way of a gate transistor 615b that is constituted by a field effect transistor (FET) or the like.

Furthermore, an OFF capacitor 616a is connected to the OFF electrode 616; it is also connected to a bit line 621-2 by way of a gate transistor 616b that is constituted by a field effect transistor (FET) or the like.

Opening and closing of the gate transistor 615b and gate transistor 616b are controlled through the word line 631.

Specifically, a single horizontal row of pixel elements 610 lined up with an arbitrary word line 631 is simultaneously selected, and the charging and discharging of capacitance to and from the ON capacitor 615a and OFF capacitor 616a is controlled by a bit line driver unit and a word line driver unit. Thereby the individual ON/OFF controls of the mirror 611 within the present single horizontal row are carried out.

In other words, the ON capacitor 615a and gate transistor 615b placed on the side where the ON electrode 615 is placed constitute a DRAM-structured memory cell M1.

Likewise, the OFF capacitor 616a and gate transistor 616b placed where the OFF electrode 616 is placed constitute a DRAM-structured memory cell M2.

With this configuration, the tilting operation for the mirror 611 is controlled in accordance with, for example, the presence and absence of data written to the respective memory cells of the ON electrode 615 and OFF electrode 616.

Incidentally, the configuration shown in FIG. 2 requires one mirror element with two drive circuits to be connected to two address electrodes.

This requirement creates a problem, however. The area occupied by the drive circuits that are connected to the respective address electrode are placed on the substrate. Therefore, if a very large number of mirror elements must be placed on the substrate, in order to produce a video image with a very high resolution, such as super high definition television (super HD TV), the area of the drive circuit occupying the substrate increases with the number of mirror elements. This eventually results in the need to enlarge the substrate itself and, thus, in a larger micromirror device at a high cost, which is a shortcoming of the configuration.

SUMMARY OF THE INVENTION

A first exemplary embodiment of the present invention provides display device implemented with a spatial light modulator (SLM) comprising a plurality of pixel elements arranged in array to modulate incident light and display an image, wherein each of the pixel elements comprises a movable electrode and a stationary electrode; a drive circuit connected to the movable electrode and receives image data for applying a voltage applied to control the movable electrode in accordance with image data, and a voltage application circuit for applying and controlling a voltage applied to the stationary electrode to control a moving speed of the movable electrode.

A second exemplary embodiment of the present invention provides a display device implemented with a spatial light modulator (SLM) comprising a plurality of pixel elements arranged in array to modulate an incident light and display an image, wherein each of the pixel elements comprises a movable electrode and at least a stationary electrode; a drive circuit connected to the movable electrode and receives image data for applying a voltage applied to control the movable electrode in accordance with image data, and a voltage application circuit connected to the stationary electrode for adjusting a voltage applied to the stationary electrode for preventing a sticking between the movable electrode and the stationary electrode.

A third exemplary embodiment of the present invention provides a micromirror device implemented with a spatial light modulator (SLM) comprising a plurality of mirror elements arranged in an array to deflect an incident light for displaying an image, wherein each of the mirror elements comprises a mirror electrode and two stationary electrodes disposed on both sides of a deflection axis of the mirror electrode an elastic hinge for supporting and deflecting the mirror electrode, a drive circuit connected to a mirror electrode through the elastic hinge wherein the drive circuit receives image data to apply and control an voltage applied to the mirror electrode; and a voltage application circuit for controlling a voltage applied to the stationary electrode for generating an imbalanced electrostatic force between each stationary electrode and mirror electrode.

BRIEF DESCRIPTION OF THE DRAWINGS

The present invention will be further explained in the following detailed descriptions of the accompanying drawings.

FIG. 10A is a top view diagram showing a mirror element and electrodes according to the first preferred embodiment of the present invention.

FIG. 10B is a front view diagram showing a mirror element and electrodes according to the first embodiment of the present invention.

FIG. 10C is a right side view diagram showing a mirror element and electrodes according to the first embodiment of the present invention.

FIG. 10D is a top view diagram showing a mirror element and electrodes according to an exemplary modification of the first embodiment of the present invention.

FIG. 10E is a front view diagram showing a mirror element and electrodes according to an exemplary modification of the first embodiment of the present invention.

FIG. 11A is a top view diagram showing a mirror element and electrodes according to an exemplary modification of the first embodiment of the present invention.

FIG. 11B is a front view diagram showing a mirror element and electrodes according to an exemplary modification of the first embodiment of the present invention.

FIG. 11C is a right side view diagram showing a mirror element and electrodes according to an exemplary modification of the first embodiment of the present invention.

FIG. 19A is a top view diagram showing a mirror element and electrodes according to the second preferred embodiment of the present invention.

FIG. 19B is a front view diagram showing a mirror element and electrodes according to the second embodiment of the present invention.

FIG. 19C is a right-side view diagram showing a mirror element and electrodes according to the second embodiment of the present invention.

FIG. 25A is a top view diagram showing a mirror element and electrodes according to the third preferred embodiment of the present invention.

FIG. 25B is a front view diagram showing a mirror element and electrodes according to the third embodiment of the present invention.

FIG. 25C is a right side view diagram showing a mirror element and electrodes according to the third embodiment of the present invention.

FIG. 28A is a top view diagram showing a mirror element and electrodes according to the fourth preferred embodiment of the present invention.

FIG. 28B is a front view diagram showing a mirror element and electrodes according to the fourth embodiment of the present invention.

FIG. 28C is a right side view diagram showing a mirror element and electrodes according to the fourth embodiment of the present invention.

DESCRIPTION OF THE PREFERRED EMBODIMENTS

Figure 1A:
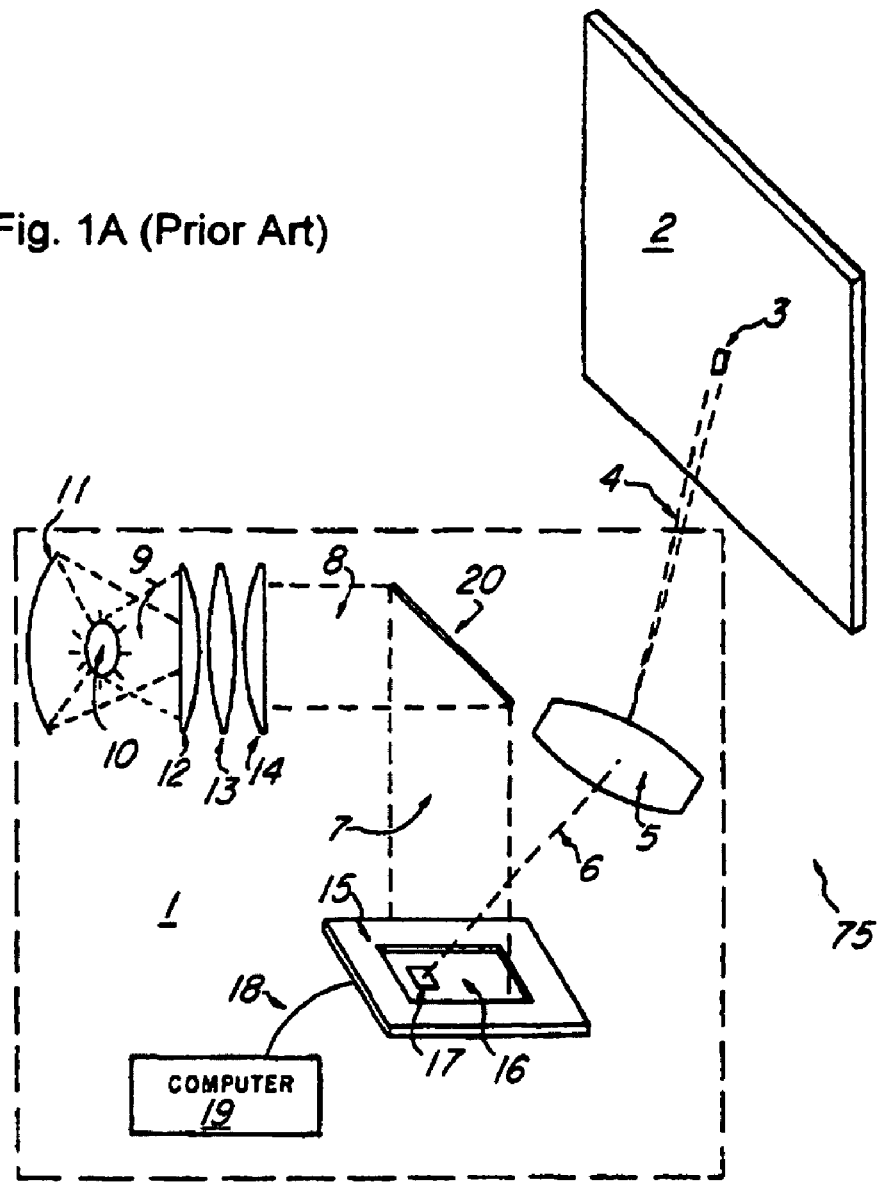
FIG. 1A shows a perspective system diagram of an image projection system of a related art for illustrating the basic principle of a projection display using a micromirror device.
Figure 1B:
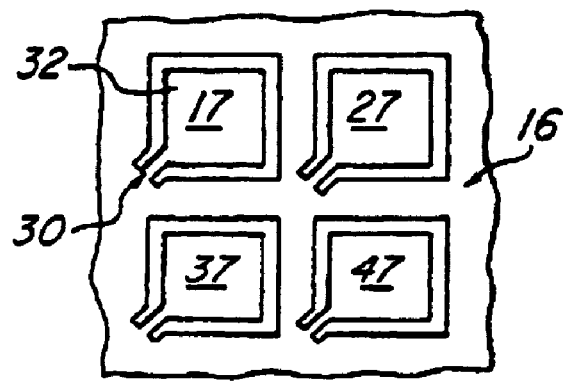
FIG. 1B shows a top view of four adjacent micromirrors of a related art illustrating the basic principle of a micromirror device used for a projection display.
Figure 1C:
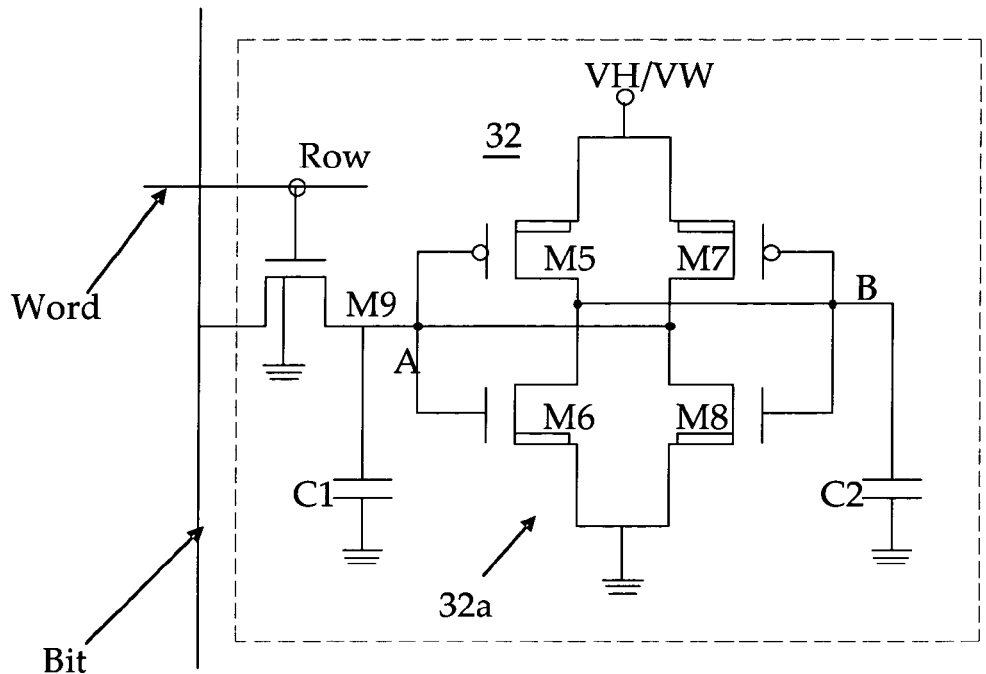
FIG. 1C shows a circuit diagram of the driving circuit according to a related art.
Figure 1D:
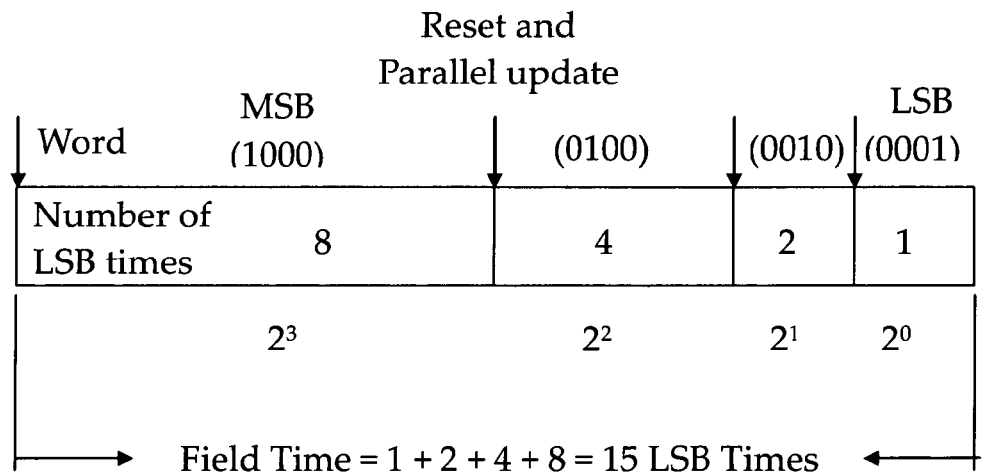
FIG. 1D shows the bit structure diagram for illustrating scheme of the Binary Pulse Width Modulation (Binary PWM) of conventional digital micromirrors for generating gray scale.
Figure 2:
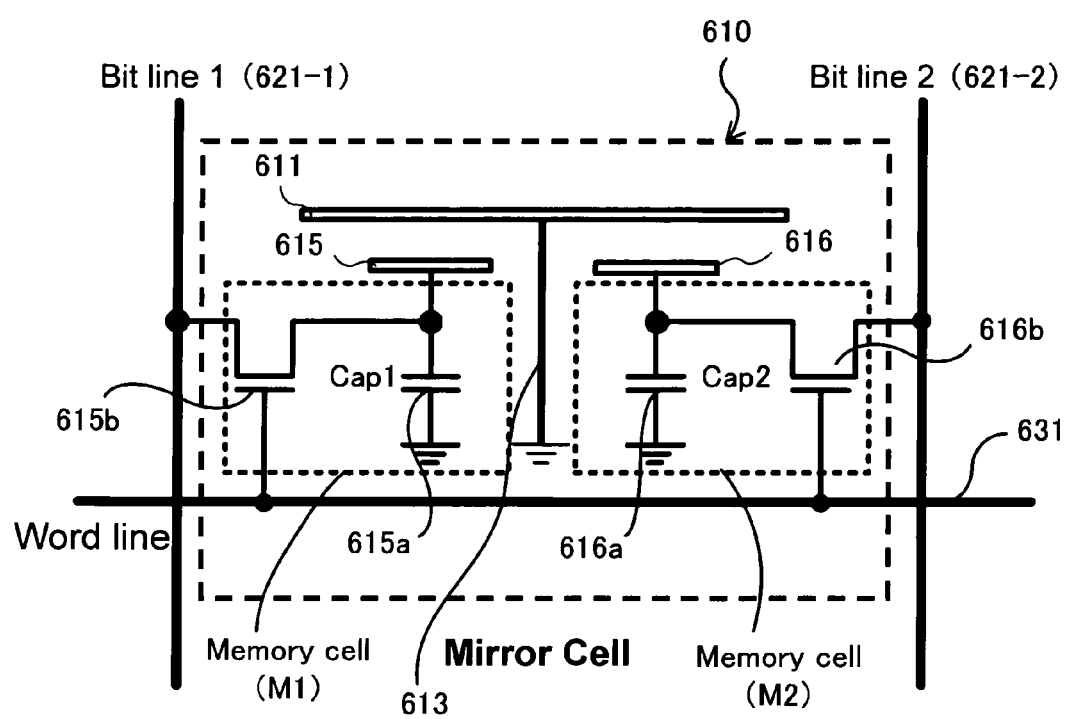
FIG. 2 is a circuit diagram showing the cross section of a conventional mirror element.
Figure 3:
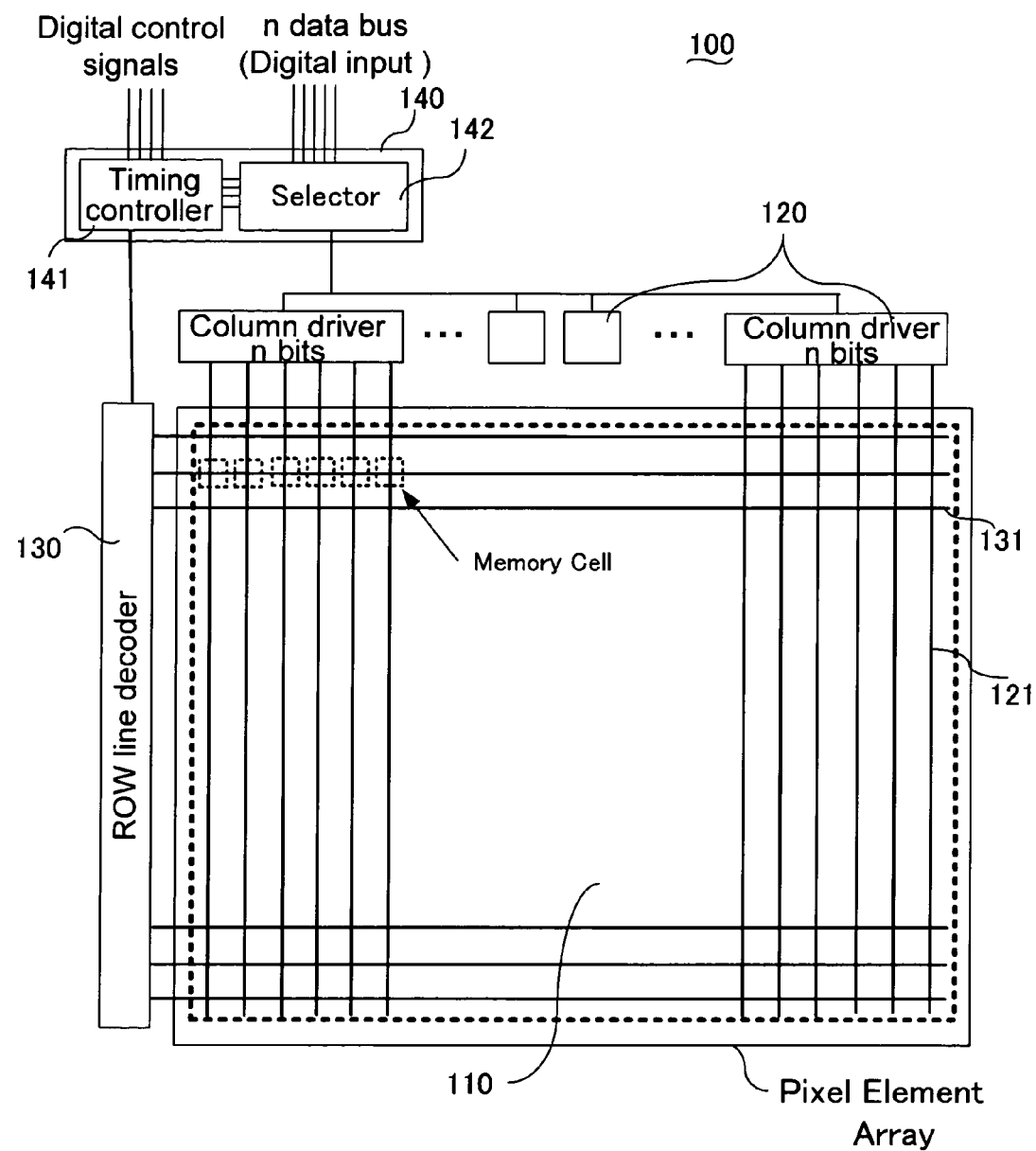
FIG. 3 is a functional circuit diagram showing an exemplary layout of the internal configuration of a micromirror device.

The following describes the internal connections and functions of a micromirror device of a display device. The micromirror device may also be implemented in different projection apparatuses. FIG. 3 is a conceptual diagram showing an example layout of the internal configuration of a micromirror device 100.

As illustrated in FIG. 3, the micromirror device 100 comprises pixel elements 110, column drivers 120, a row line decoder 130, and an external interface unit 140.

The external interface unit 140 comprises a timing controller 141 and a selector 142. The timing controller 141 controls the row line decoder 130 on the basis of a timing signal from an SLM controller (which is described later). The selector 142 supplies the column driver 120 with a digital signal received from the SLM controller.

The individual pixel elements 110 are arranged in a matrix at positions where the vertically extended bit lines 121 intersect with horizontally extended wordlines 131. The bits lines are connected to and controlled by the column drivers 120. The word lines 131 are connected to and extended from the row line decoder 130.

Figure 4:
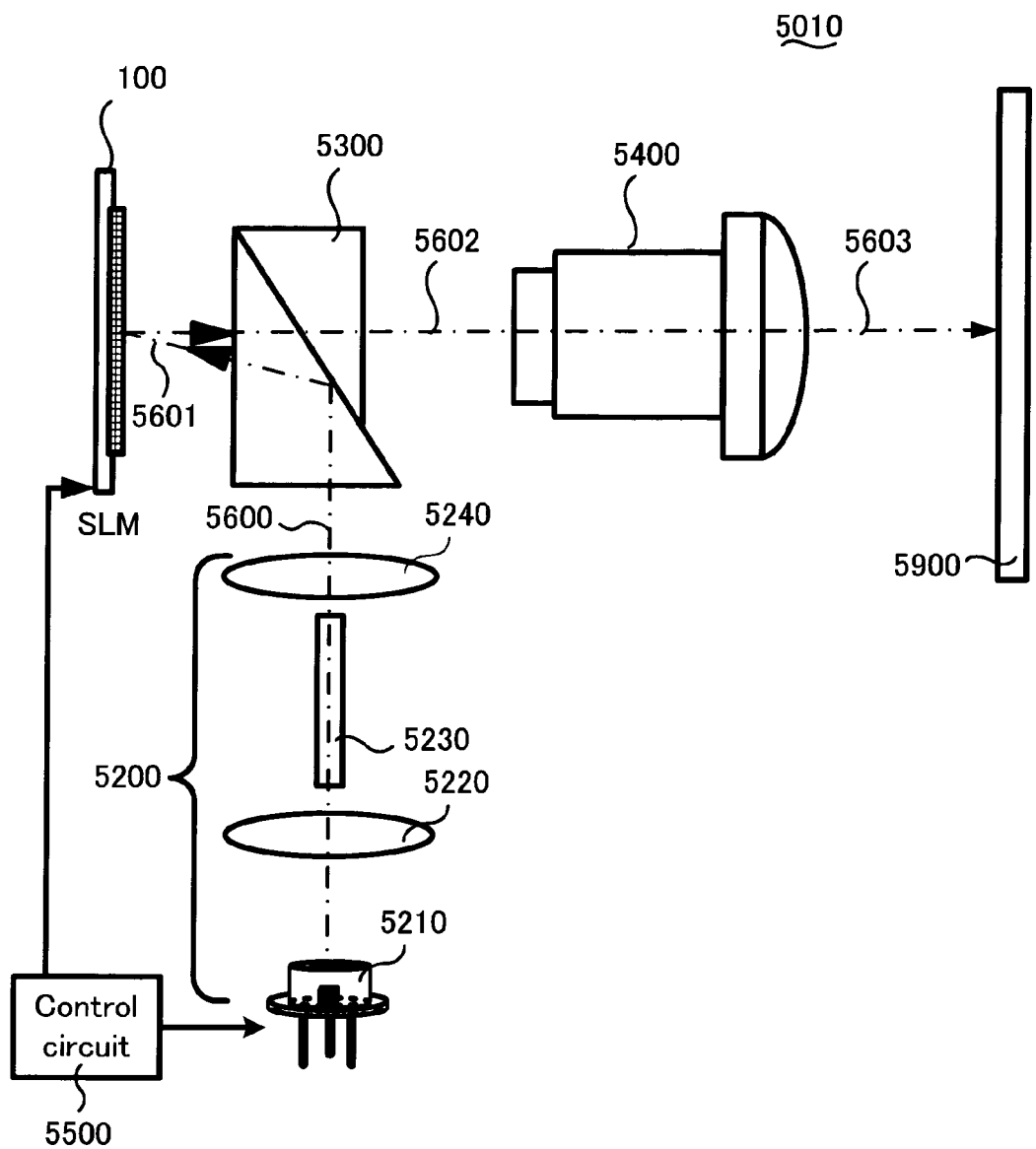
FIG. 4 is a functional block diagram showing the configuration of a projection apparatus comprising a micromirror device according to a preferred embodiment of the present invention.

FIG. 4 is a conceptual diagram showing the configuration of a projection apparatus comprising a micromirror device according to a preferred embodiment of the present invention.

As shown in FIG. 4, a projection apparatus 5010 of this invention that comprises a single micromirror device 100, a control unit 5500, a Total Internal Reflection (TIR) prism 5300, a projection optical system 5400, and a light source optical system 5200.

The projection apparatus 5010 is generally known as a single-panel projection apparatus. 5010 comprising a single micromirror device 100.

The projection optical system 5400 is implemented with a micromirror device 100 and a TIR prism 5300 disposed in the optical axis of projection optical system 5400. The light source optical system 5200 emits light transmitted on an optical axis matches with the optical axis of the projection optical system 5400.

The TIR prism 5300 receives the illumination light 5600 projected from the light source optical system 5200 and reflect the illumination light transmit toward the micromirror device 100 disposed on the left side of the TIR prism 5300. The micromirror device 100 includes a plurality of micromirrors each is controlled to deflect at a prescribed inclination angle relative to incident light 5601. The TIR prism 5300 further transmits a reflection light 5602, from micromirror device 100 toward the projection optical system 5400.

The projection optical system 5400 projects reflection light 5602 reflected from the micromirror device 100 and transmitted through the TIR prism 5300, onto a screen 5900 as projection light 5603.

The light source optical system 5200 may comprise an adjustable light source 5210 (for generating illumination light 5600). The light source optical system 5200 further includes a condenser lens 5220 for focusing illumination light 5600. The light source optical system 5200 further includes a rod type condenser body 5230, and a condenser lens 5240.

The adjustable light source 5210, condenser lens 5220, rod-type condenser body 5230, and condenser lens 5240 are placed in the aforementioned order on the optical axis of illumination light 5600 emitted from the adjustable light source 5210 and is incident to the side face of TIR prism 5300.

The projection apparatus 5010 is implemented with a single micromirror device 100 for producing a color display on the screen 5900 by applying a control process of a sequential color display method.

Specifically, the adjustable light source 5210, comprising a red laser light source, a green laser light source, and a blue laser light source not specifically shown in a drawing here. The adjustable light source 5210 provides several advantages, including 1) the light source allows for independent control of the light emission states, 2) the light source performs the operation of dividing one frame of display data into a plurality of sub-fields (i.e., three sub-fields, that is, red (R), green (G), and blue (B) in the present case), and 3) the light source emits the red laser light, green laser light, and blue laser light in a sequence controlled according to a time series based on the time band corresponding to the sub-field of each color, as described later.

Figure 5:
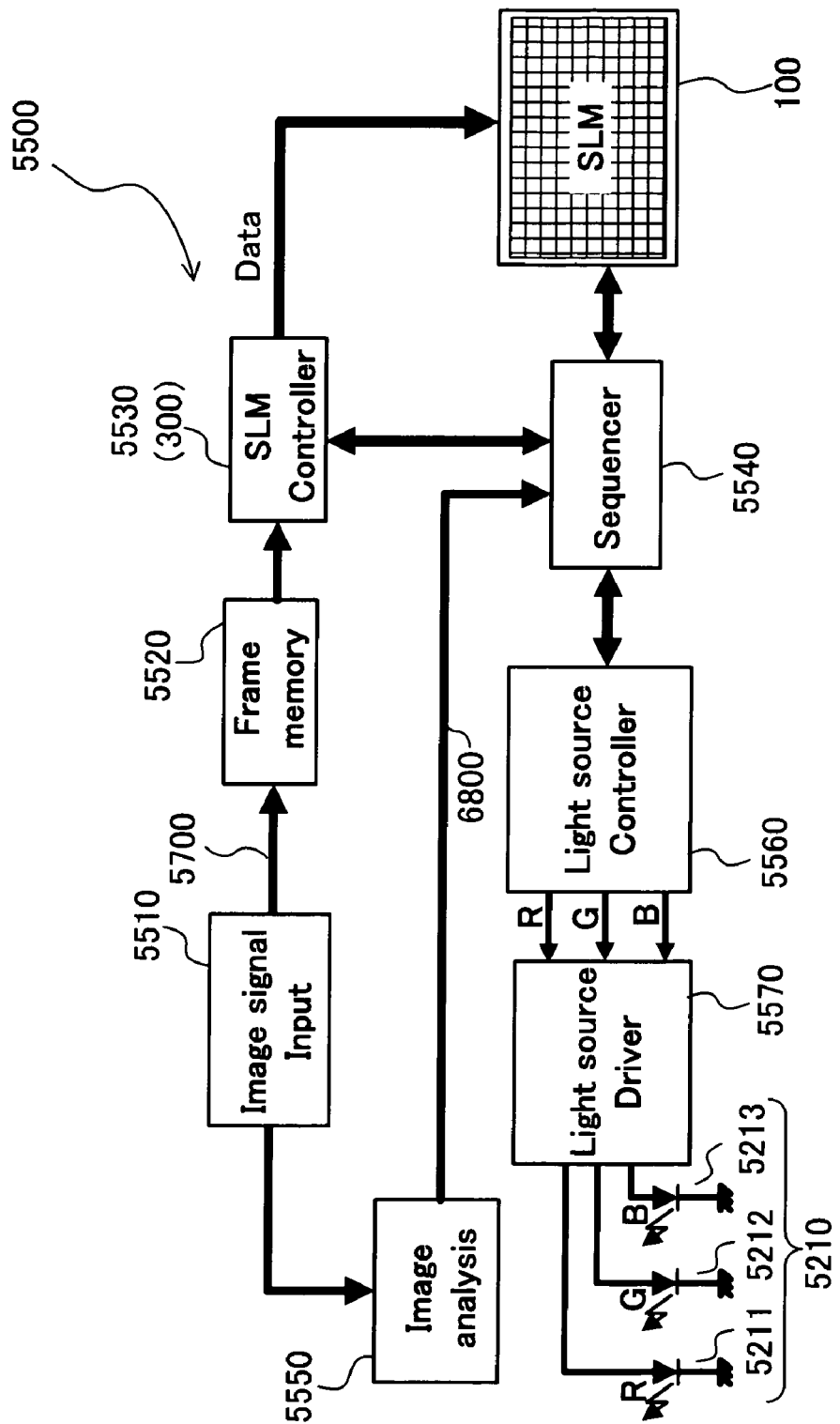
FIG. 5 is a functional block diagram showing an exemplary configuration of the control unit illustrated in FIG. 4.

FIG. 5 is a functional block diagram for showing an exemplary configuration of the control unit 5500 as the single-panel projection apparatus 5010 described above. The control unit 5500 comprises a frame memory 5520, an SLM controller 5530, a sequencer 5540, a light source control unit 5560, and a light source drive circuit 5570.

The sequencer 5540 includes a microprocessor, to control the timing sequences for operating the entire control unit 5500 and micromirror device 100.

The frame memory 5520 may retain one frame of input digital video data 5700 received from an external device (not shown in drawing) connected to a video signal input unit 5510. The input digital video data 5700 is updated in real time the display of the amount of data of one frame is completed.

The SLM controller 5530 processes the input digital video data 5700 received from the frame memory 5520 (as will be described below) by separating the data received into a plurality of sub-fields, and transmits the processed data to the micromirror device 100 as control data for controlling the ON/OFF and oscillation operations of the micromirrors, as will be described later, for a mirror element 111 of the micromirror device 100.

The sequencer 5540 outputs a timing signal to the micromirror device 100 synchronously with the data generated by the SLM controller 5530.

The video image analysis unit 5550 generates a video image analysis signal 6800 for controlling the light source to generate various light source patterns according to the input digital video data 5700 received from the video signal input unit 5510.

The light source control unit 5560 controls the light source drive circuit 5570 to further control the operation of the adjustable light source 5210 to emit the illumination light 5600 according to the video image analysis signal 6800 received from the video image analysis unit 5550 transmitted through the sequencer 5540.

The light source drive circuit 5570 driving the adjustable light source 5213 to emit the red laser light source 5211, green laser light source 5212, and blue laser light source 5213 in accordance with the control signals received from the light source control unit 5560.

Figure 6:
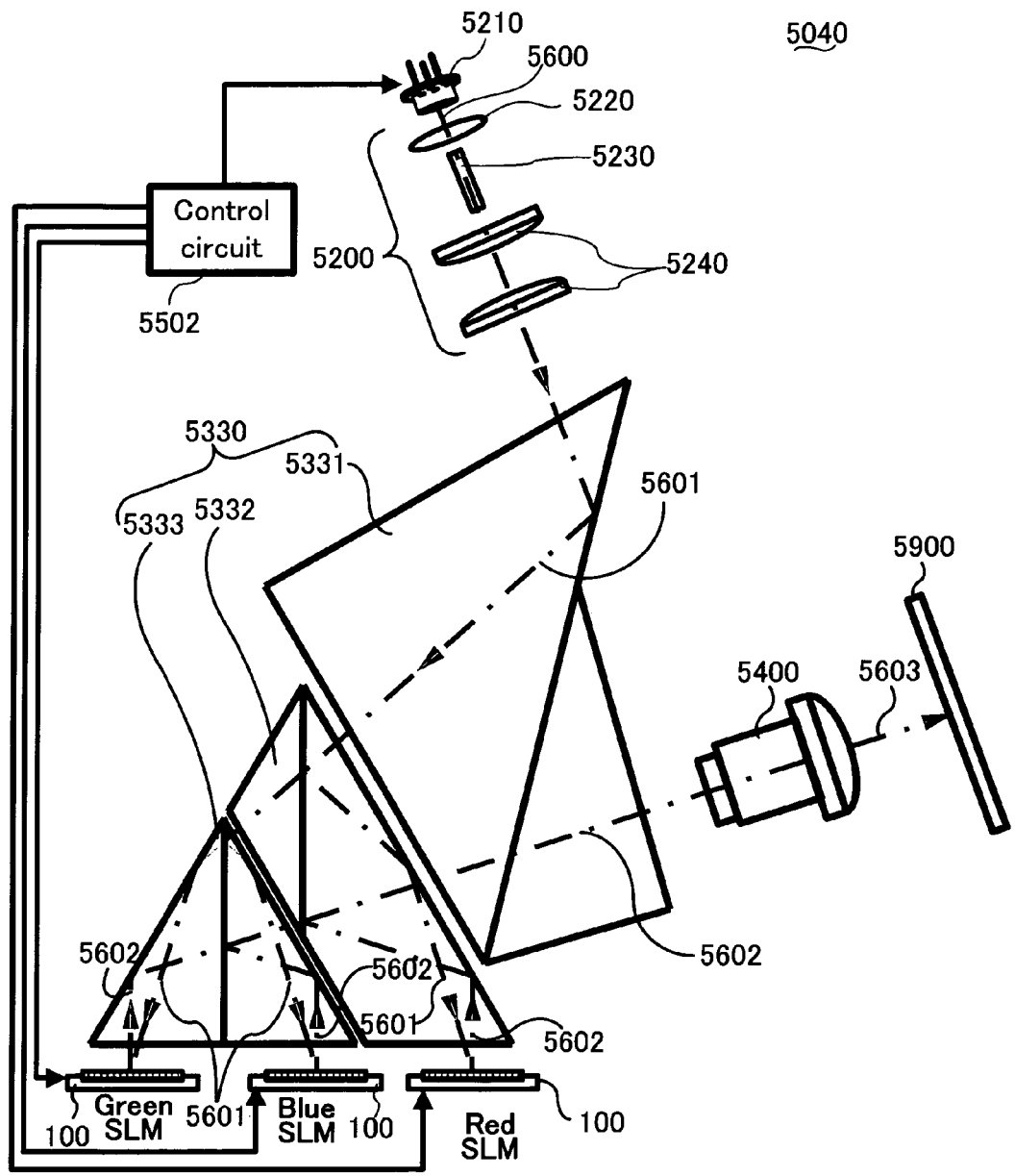
FIG. 6 is a cross sectional view for showing a multi-panel projection apparatus comprising a micromirror device according to a preferred embodiment of the present invention.

FIG. 6 is a cross sectional view as a functional diagram of a multi-panel projection apparatus comprising a micromirror device of the present invention.

The projection apparatus 5040, is implemented with three micromirror devices 100, corresponding to three respective colors R, G, and B. The micromirror devices are placed on one side of a light separation/synthesis optical system 5330 adjacent to one another in the same plane.

This configuration saves space by consolidating the plurality of micromirror devices 100 into the same packaging unit such a single package containing three micromirror devices (not specifically shown here).

The light separation/synthesis optical system 5330 comprises a TIR prism 5331, a TIR prism 5332, and a TIR prism 5333.

The TIR prism 5331 guides the illumination light 5600 to project as incident light 5601 along a lateral direction relative to the optical axis of the optical axis of the projection optical system 5400 to a micromirror device 100.

The TIR prism 5332 carried out the following functions of 1) separating red colored light from incident light 5601, 2) guiding the red light to the micromirror device 100 (for red-colored light), and 3) capturing reflection light 5602 of the separated incident light and guiding the reflected light to the projection optical system 5400.

Likewise, the TIR prism 5333 carries out the following functions of 1) separating green and blue colored incident lights from the incident light 5601, 2) guiding the green and blue lights to project onto the corresponding micromirror device 100 specifically implemented for each of the respective colors), and 3) capturing reflection lights 5602 of the respective colors to guide the reflected lights to the projection optical system 5400.

Figure 7:
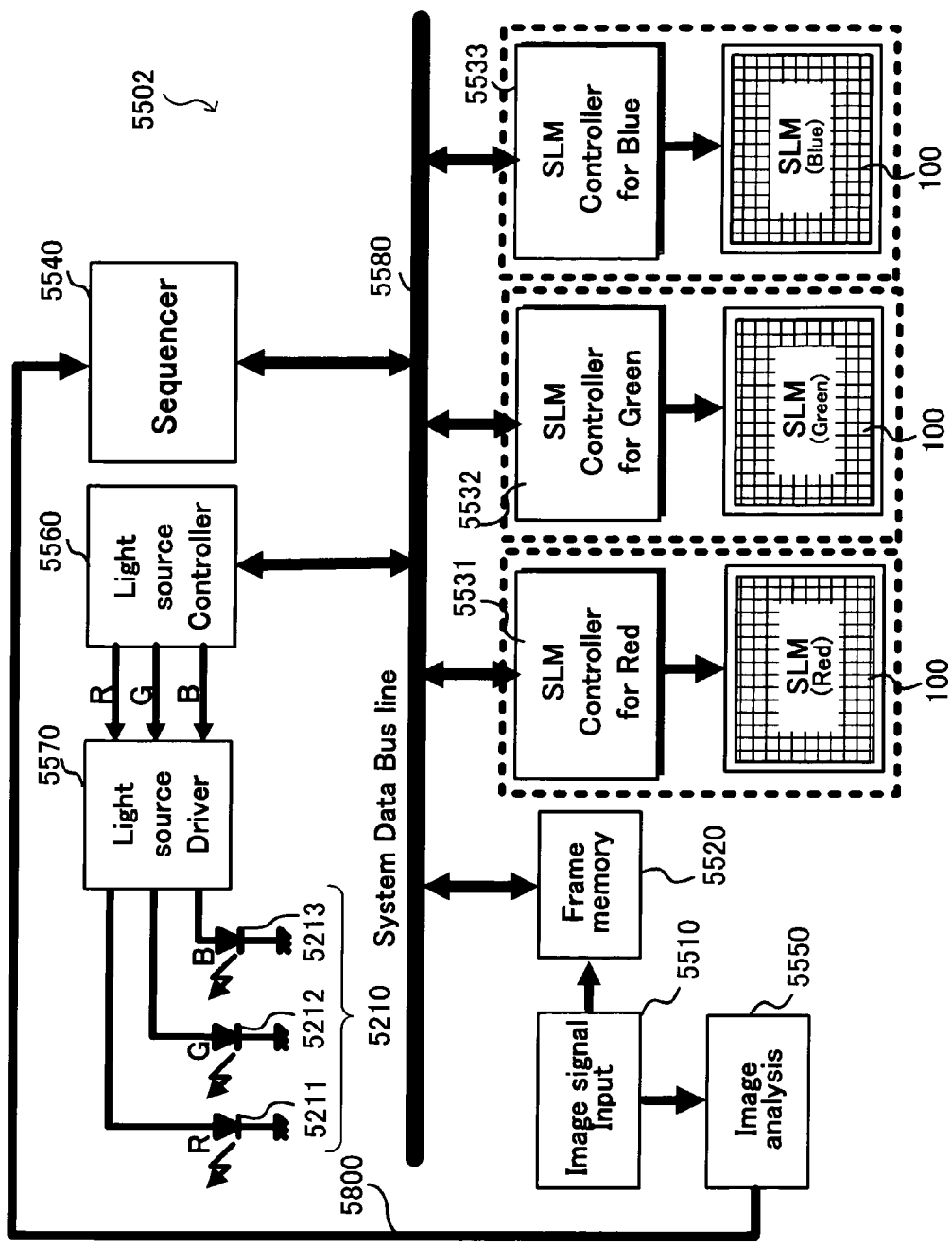
FIG. 7 is a functional block diagram showing an exemplary configuration of the control unit illustrated in FIG. 6.

FIG. 7 is a functional block diagram for showing an exemplary configuration of the control unit of a multi-panel projection apparatus comprising a micromirror device of the present invention.

The control unit 5502 comprises a plurality of SLM controllers 5531, 5532, and 5533 for controlling micromirror devices 100 implemented specifically for the respective colors R, G, and B. The functional components of these control units are different from the above described control unit 5500.

Specifically, the SLM controller 5531, SLM controller 5532, and SLM controller 5533 correspond to the micromirror devices 100 for their specific color, are placed on the same substrates as those of the corresponding micromirror device 100. The micromirror devices 100 are implemented with the corresponding SLM controller 5531, SLM controller 5532, and SLM controller 5533 and these controllers may be place close to each another to improve and achieve a high-speed data transfer rate.

Furthermore, a system bus 5580 is implemented to connect frame memory 5520, the light source control unit 5560, the sequencer 5540, and the SLM controllers 5531 through 5533, in order to speed up and simplify the connection path of each connecting element.

Figure 8:
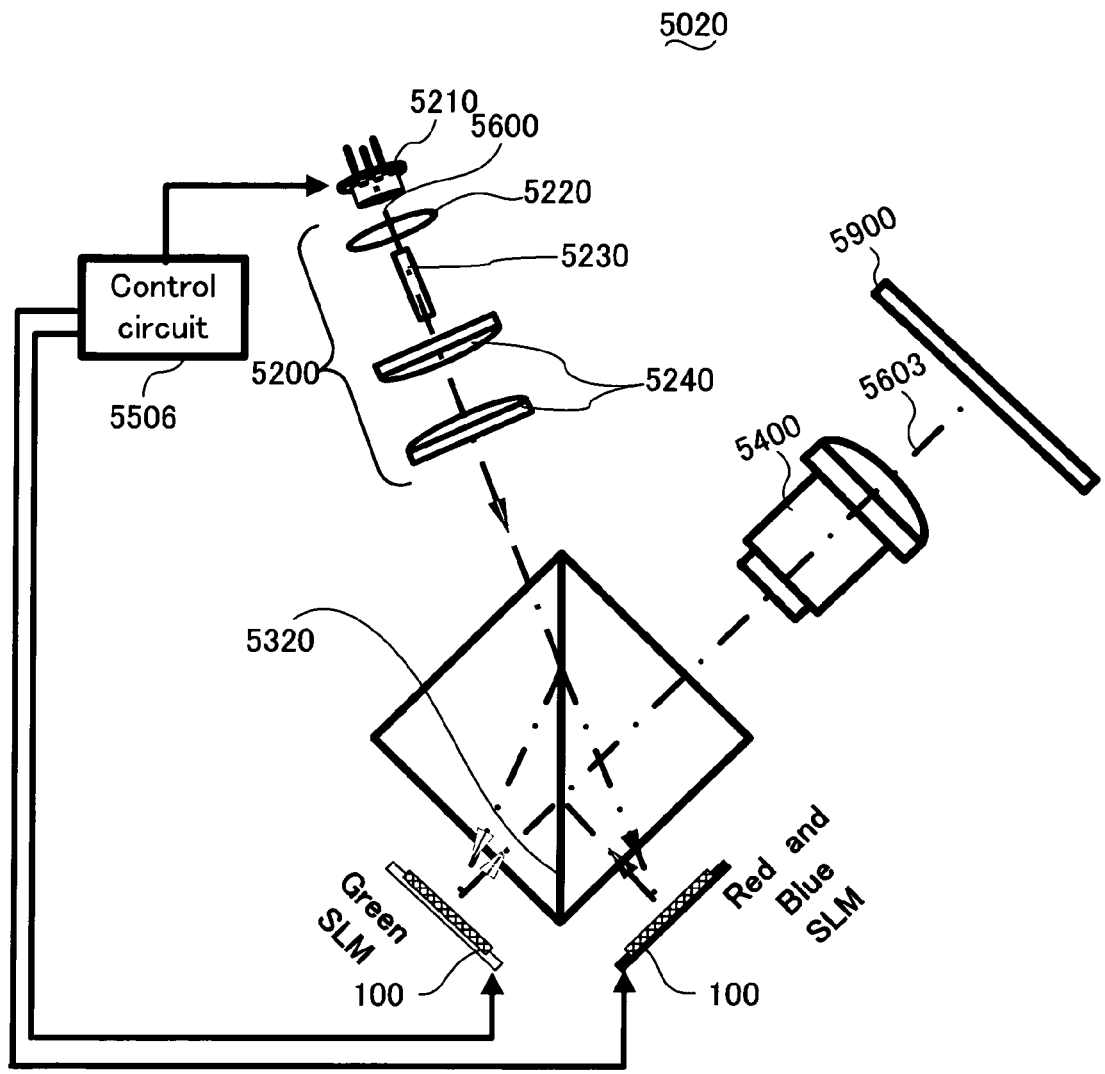
FIG. 8 is a cross sectional view for showing an exemplary modification of a multi-panel projection apparatus comprising a micromirror device according to a preferred embodiment of the present invention.

FIG. 8 is a cross sectional view as a functional diagram for showing an exemplary modification of a multi-panel projection apparatus comprising a micromirror device of the present invention.

FIG. 8 shows a projection apparatus 5020 that is implemented with two micromirror devices 100 to modulate the green light and the red and blue lights.

Specifically, the projection apparatus 5020 comprises a dichroic mirror 5320 as a light separation/synthesis optical system.

The dichroic mirror 5320 separates the wavelength component of a green light and the wavelength components of red and blue lights from the incidence light 5601 emitted from the light source optical system 5200. This causes each wavelength to branch into the micromirror devices 100, synthesizing reflection light 5602 (of the green light reflected (i.e., modulated) by the corresponding spatial light modulator 200) with the reflection light of the red and blue light (reflected (i.e., modulated) by the corresponding micromirror devices 100), guiding the synthesized light to transmit along the optical axis of the projection optical system 5400, and projecting the synthesized light onto a screen 5900 as projection light 5603.

Figure 9:
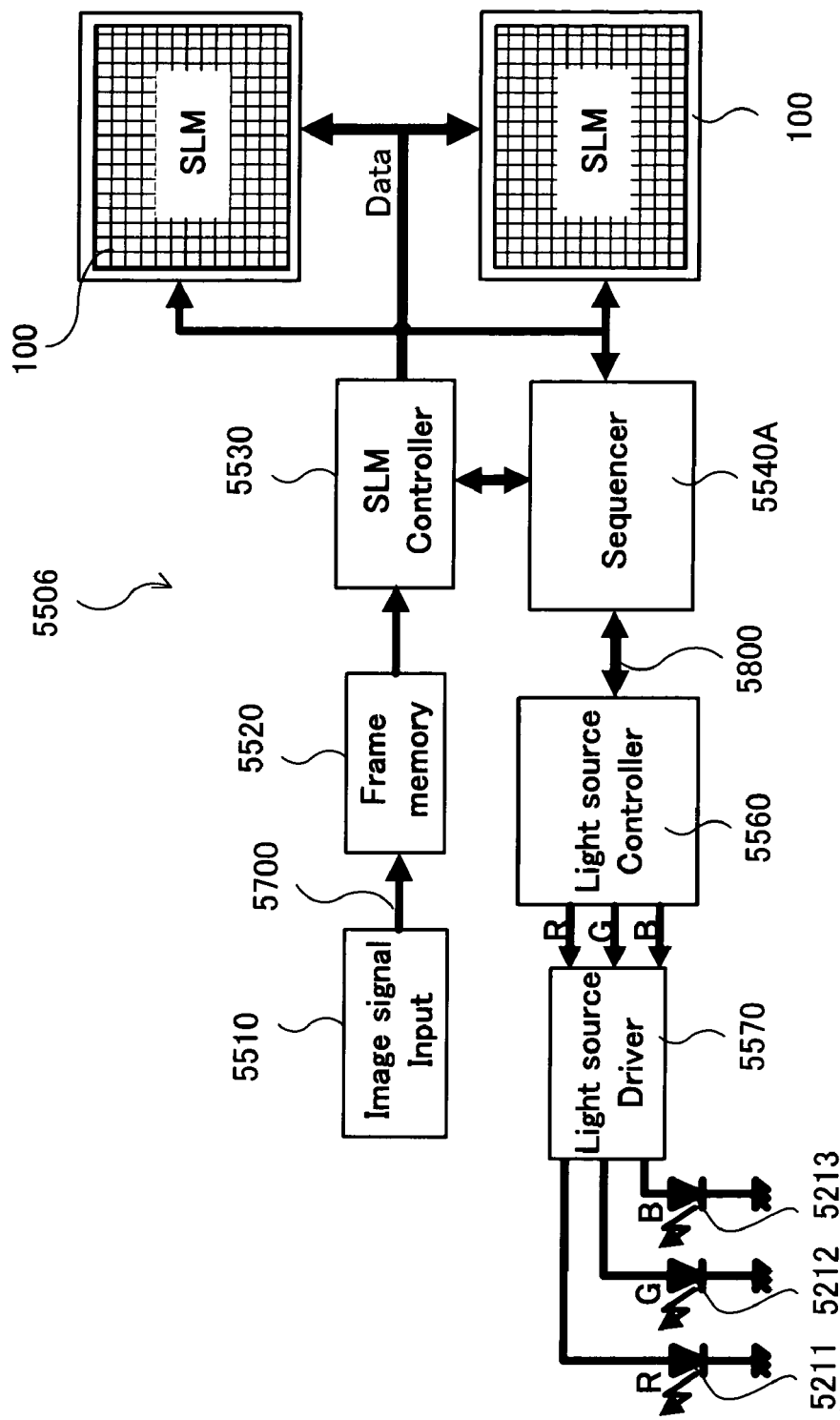
FIG. 9 is a functional block diagram showing an exemplary configuration of the control unit illustrated in FIG. 8.

FIG. 9 is a functional block diagram for showing an exemplary configuration of the control unit 5506 in the projection apparatus 5020 comprising the above described two micromirror devices 100. In this case, the SLM controller 5530 controls two micromirror devices 100, and this is the only from the only way the configuration differs from that shown in FIG. 5.

First Embodiment

FIGS. 10A, 10B, and 10C are the top view diagram, front view diagram, and right side view diagram, respectively, of a mirror 111 and electrodes 115 and 116 according to the first preferred embodiment of the present invention.

An ON electrode 115 and an OFF electrode 116 are placed, with a hinge 113 between the two electrodes, under one mirror element 111, i.e., an address mirror; defined I the present invention as a mirror electrode. The mirror electrode 111 is supported by the hinge 113 and controlled to deflect to different a range of deflection angles.

The mirror element 111 is connected to a drive circuit as described below to control the voltage applied to the mirror element 111 in accordance with the image data. Therefore, hinge 113 can be made of an electrically conductive material, e.g., a metallic material such as aluminum or copper. The hinge may also be made of an electrically conductive silicon material produced by applying a doping process using phosphorus (P), arsenic (As), or the like, to a silicon material, such as poly-silicon and amorphous silicon.

Both the ON electrode 115 and the OFF electrode 116 are controlled under the same potential, and the distances of both from the mirror element 111 are the same. Meanwhile, the ON electrode 115 and OFF electrode 116 have mutually different areas (i.e., electrode areas) of the faces opposite to the mirror element 111.

With this configuration, an electrostatic force generated between the ON electrode 115 and the mirror element 111 is different from the electrostatic force generated between the OFF electrode 116 and the mirror element 111.

Figures 10F, 10G:
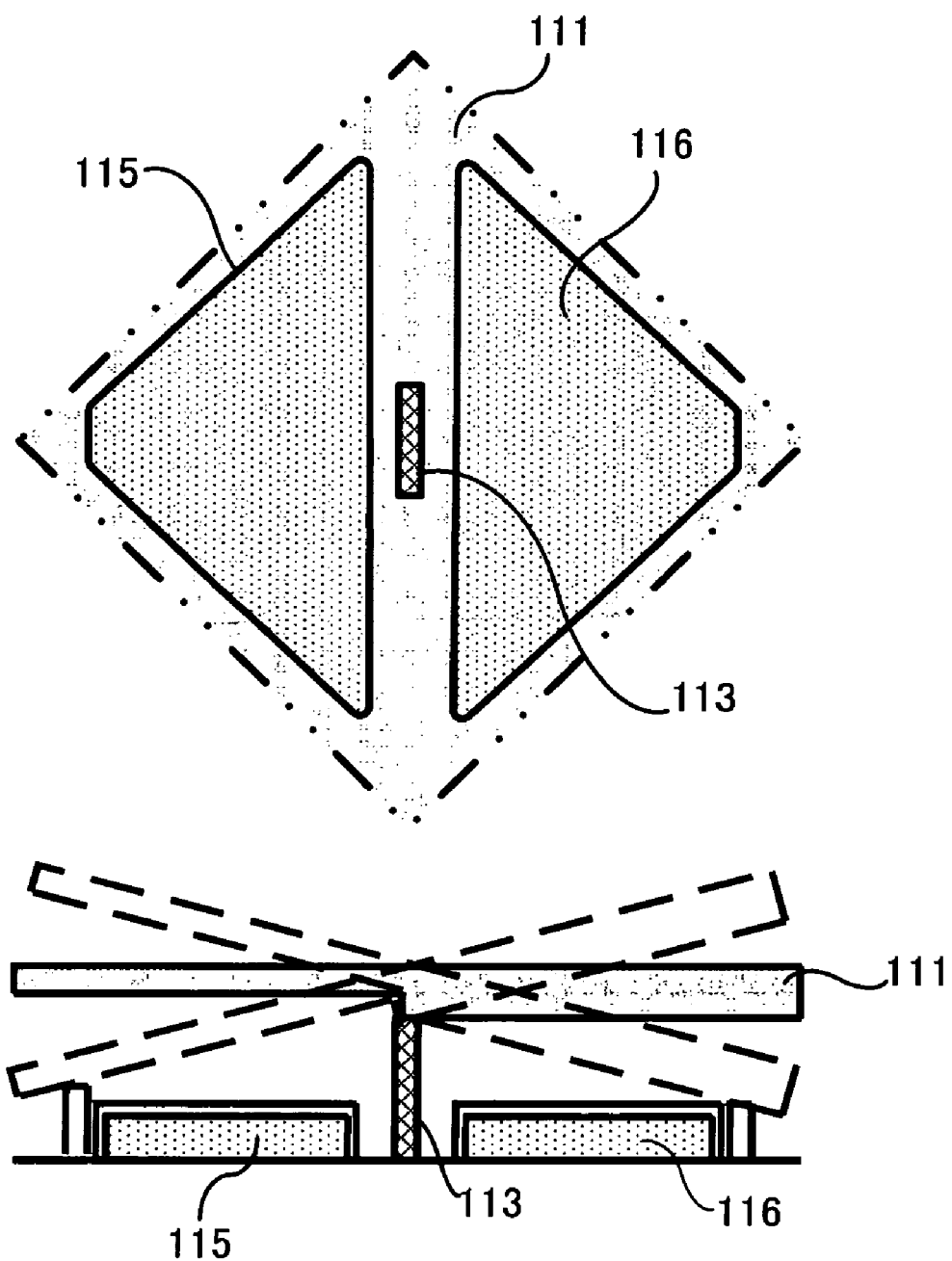
FIG. 10F is a top view diagram showing a mirror element and electrodes according to an exemplary modification of the first embodiment of the present invention.
FIG. 10G is a front view diagram showing a mirror element and electrodes according to an exemplary modification of the first embodiment of the present invention.

More specifically, in order to generate an electrostatic force between the ON electrode 115 and mirror element 111 different from that between the OFF electrode 116 and mirror element 111, there are several methods that can be used. One method is to form the electrodes and mirror with the distance between the ON electrode 115 and mirror element 111 different from the distance between the OFF electrode 116 and mirror element 111 by differentiating the heights of the ON electrode 115 and an OFF electrode 116 as shown in FIGS. 10D and 10E. A second method to form the mirror and the electrodes with the distances different by extending, downward, a part opposite to the OFF electrode 116 (or the part opposite to the ON electrode 115) of the mirror element 111 as shown in FIGS. 10F and 10G A third method is to form the mirror and electrodes with different materials for the respective electrodes 115 and 116, and for the mirror element 111. A fourth method is to generate different potentials between the ON electrode 115 and an OFF electrode 116.

Furthermore, the mirror element 111 may be controlled to deflect to the ON side or OFF side by forming a single electrode 117 over the entire surface under mirror element 111 and shifting the position of the hinge 113 from the center of mirror element 111 to either the ON or OFF side, as shown in FIGS. 11A, 11B, and 11C.

Furthermore, a single electrode 117 may be formed to control a plurality of mirror elements 111. For example, the electrodes placed on one ROW line of a pixel array may be formed as one electrode, or the electrodes opposite to the mirror elements 111 of the entire pixel array may be integrally formed.

Figure 12:
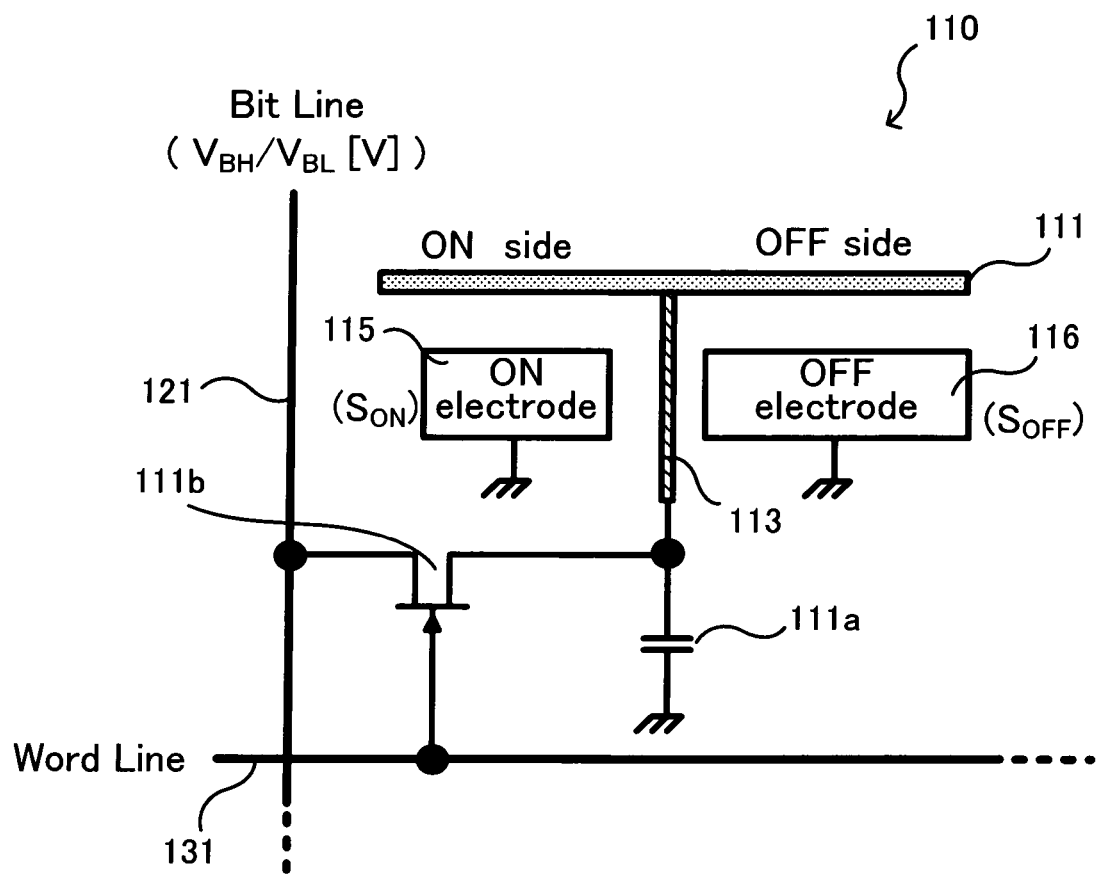
FIG. 12 is a cross-sectional view for showing a circuit diagram of a pixel element according to the first embodiment of the present invention.

FIG. 12 is functional circuit diagram for showing a pixel element according to the present embodiment.

As shown in FIG. 12, the pixel elements 110 implemented with the mirror elements 111 are arranged as mirror array in a grid at the respective positions at the intersections of the vertically extended bit lines 121 and the horizontally extended word lines 131.

The mirror element 111 is controlled to deflect to a range of angles and is supported by a substrate (not shown in a drawing here) by way of a hinge 113.

The above described ON electrode 115 and OFF electrode 116, of which the areas of the electrodes are mutually different, are placed on the substrate, with the hinge 113 sandwiched between them.

Both the ON electrode 115 and OFF electrode 116 are grounded.

When a predetermined voltage is applied, the mirror element 111 is controlled to deflect by the electrostatic force generated between the mirror element 111 and the respective electrodes 115 and 116. The mirror 111 is controlled to deflect to a position abutting on a stopper equipped on the ON side or OFF side. When the mirror is operated to deflect to different angles, the incident light incident to the mirror element is reflected to the light path of either an ON position, matching the optical axis of a projection optical system, or of an OFF position, shifted away from the aforementioned optical axis.

A capacitor 111a is connected to the mirror element 111, and the capacitor 111a is connected to a bit line 121 by way of a gate transistor 111b including a field effect transistor (FET).

The gate transistor 111b is controlled to turn on and off by the word line 131.

More specifically, the capacitor 111a and gate transistor 111b constitute a so-called dynamic random access memory (DRAM)-structured memory cell.

With this configuration, the tilting operation for the mirror element 111 is controlled in accordance with, for example, the presence or absence of data written to the memory cell.

Figure 13:
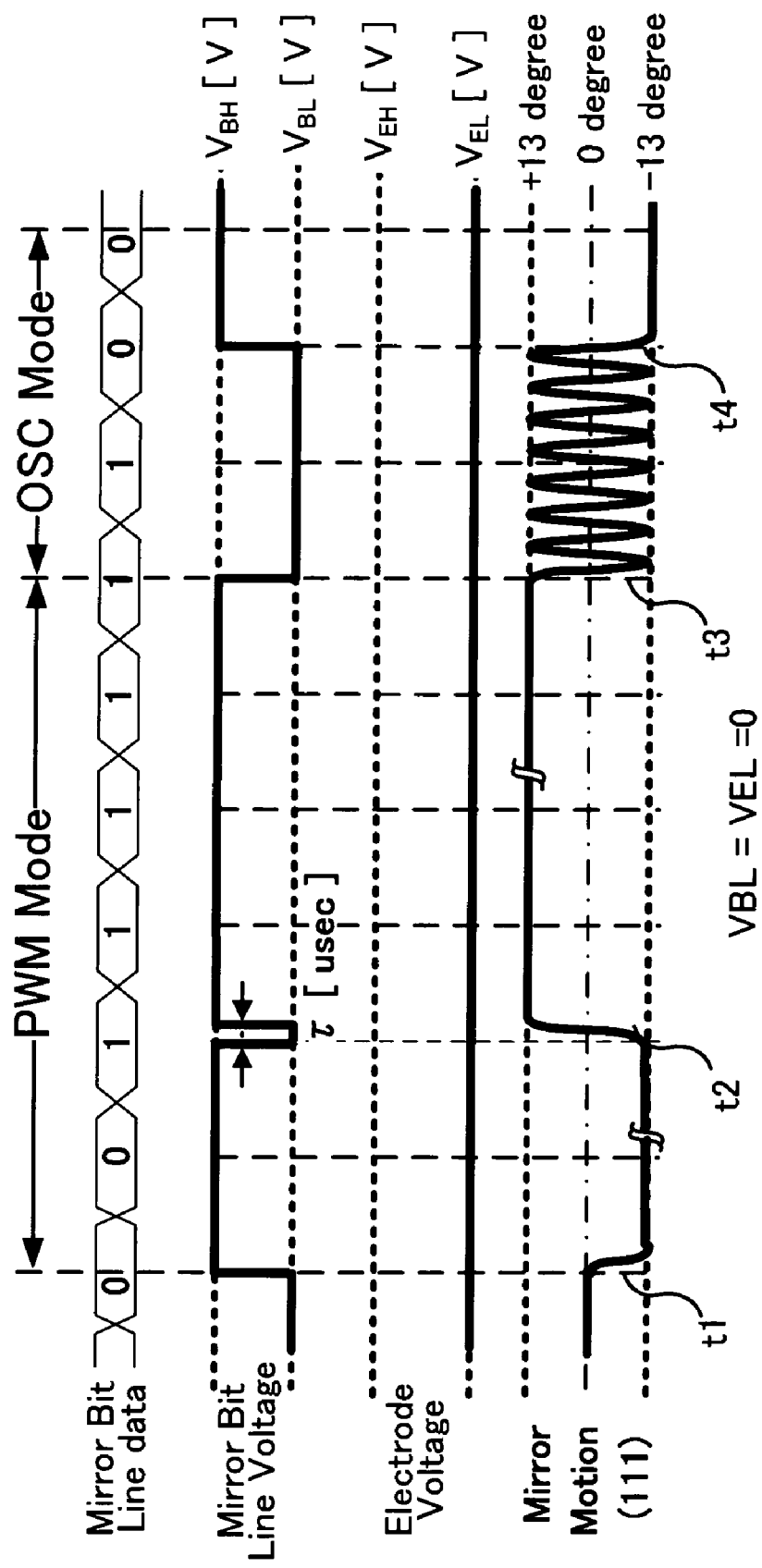
FIG. 13 is a timing diagram showing the correlation between the operation timing of a pixel element and the behavior of a mirror element according to the first embodiment of the present invention.

FIG. 13 is a time graph showing the correlation between the operation timing of the pixel element 110 and the behavior of the mirror element 111. More specifically, "mirror bit line data" is data indicating the time at which the deflection state of the mirror element 111 shifts.

Since the ON electrode 115 and OFF electrode 116 are grounded (GND), the electrode voltage is at a GND level voltage $V_{EL}$.

When a mirror bit line voltage $V_{BH}$ is applied in the initial horizontal state of the mirror element 111 at a specific time (i.e., at time t1, which is the start point of a pulse width modulation (PWM) control period), the mirror element 111 is attracted to the OFF side (at −13 degrees) by the electrostatic force because the electrode area of the OFF electrode 116 is larger than that of the ON electrode 115.

Then, at time t2, at which the mirror bit line data is loaded from 0 to 1, the mirror bit line voltage is lowered to a GND level voltage $V_{BL}$ only for the period of time τ [μsec].

The lowering of the voltage during the period of time τ [μsec] causes the mirror element 111, ON electrode 115, and OFF electrode 116 to be lowered to the GND level voltage, and, therefore, no electrostatic force is generated in the mirror element 111.

This causes the mirror element 111 leaves from the OFF side to move to the initial state and then to the ON side (at +13 degrees) due to the reaction. Then, when the mirror element 111 is tilted to the ON side (at the elapsed time τ[μsec]), a mirror bit line voltage $V_{BH}$ is applied to the mirror element 111 once again. In this event, the distance from the mirror element 111 to the ON electrode 115 is shorter than to the OFF electrode 116, and therefore the mirror element 111 is attracted by the electrostatic force to the ON side.

Specifically, the time τ is determined by both the resonance frequency of the hinge 113 and the voltage applied to the mirror element 111, and is the time at which the mirror element 111 tilts toward the electrode on the opposite side and is therefore shorter than the minimum control time of the mirror and also less than one half (½) of the oscillation cycle of the mirror. More specifically, if the electric resistance values of the hinge 113 and mirror element 111 are not substantially low, the time τ must be determined with consideration of these factors. For example, when an 8-bit (256) gray scale level display is carried out by means of a PWM control in a projection apparatus employing a single mirror device as shown in FIG. 4, the control period for the mirror element 111 corresponding to the least significant bit (LSB) of the respective colors R, G, and B is approximately 21.7 [μsec] for a 1/60 [sec]-frame rate. In order to obtain a sufficient gray scale characteristic in this event, the response characteristic in tilting the mirror element 111 needs to be at least one third (1/3) of the mirror control period. Therefore, hinge 113 needs to possess spring-like properties and electrical conduction resistance (i.e., an electric conduction property) so that mirror element 111 is able to achieve a response characteristic in the neighborhood of 7.3 [μsec]. While the response characteristic needs to consider the influence of stray capacitance and the like of each wiring and connected to the hinge 113, a maximum desired resistance value is 1 giga-ohm.

During the period between control timing t3 (the start point of an OSC (oscillation) control period) and control timing t4 (when the mirror bit line voltage is lowered to the GND level voltage $V_{BL}$ for a predetermined period) the mirror element 111 shifts to the oscillation state in which it oscillates between the OFF side (i.e., −13 degrees) and ON side (i.e., +13 degrees) instead of being attracted to either ON electrode 115 or OFF electrode 116.

Then, at the control timing t4, at which the mirror bit line data is loaded from 1 to 0, when the mirror bit line voltage $V_{BH}$ is applied to the mirror element 111 once again, it is attracted to the OFF side by electrostatic force since the area of the electrode is larger in OFF electrode 116 than ON electrode 115.

Figure 14A:
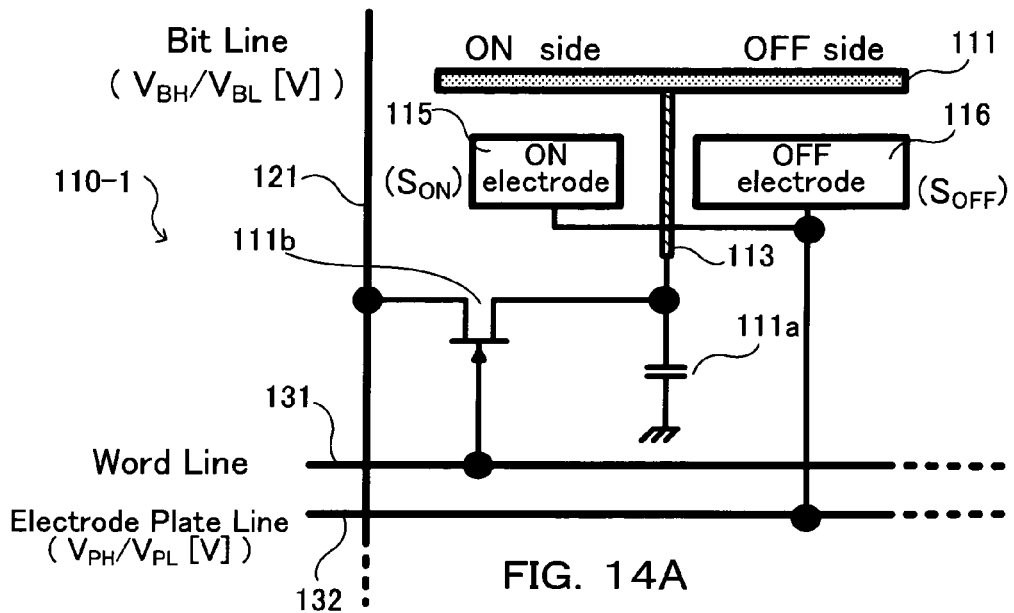
FIG. 14A a cross sectional view for showing a circuit diagram of the pixel element shown in FIG. 12 with an electrode plate line for driving an electrode.

FIG. 14A is an outline diagram showing an example of providing the pixel element 110 shown in FIG. 12 with an electrode plate line 132 for driving the electrodes 115 and 116.

Figure 14B:
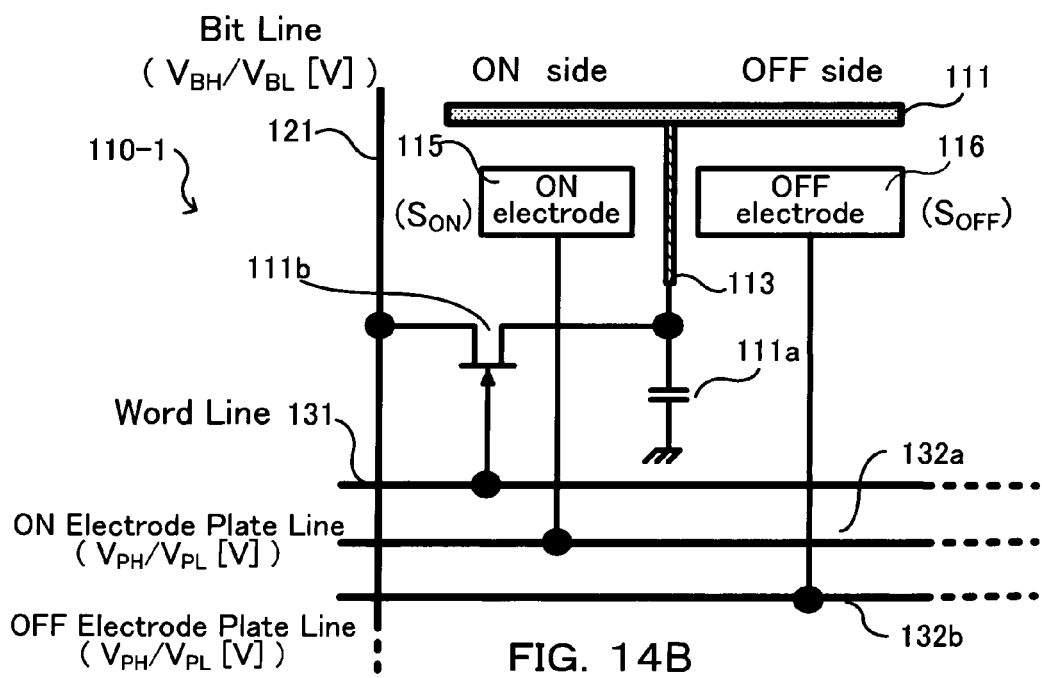
FIG. 14B is a cross sectional view for showing a circuit diagram of replacing the electrode plate line of the pixel element, as shown in FIG. 14A, with an ON electrode plate line connected to the ON electrode and an OFF electrode plate line connected to the OFF electrode.

FIG. 14B is an outline diagram showing an example of changing the electrode plate line 132 of the pixel element shown in FIG. 14A to an electrode plate line 132a that is connected to the ON electrode 115 and an electrode plate line 132b that is connected to the OFF electrode 116.

Figure 15:
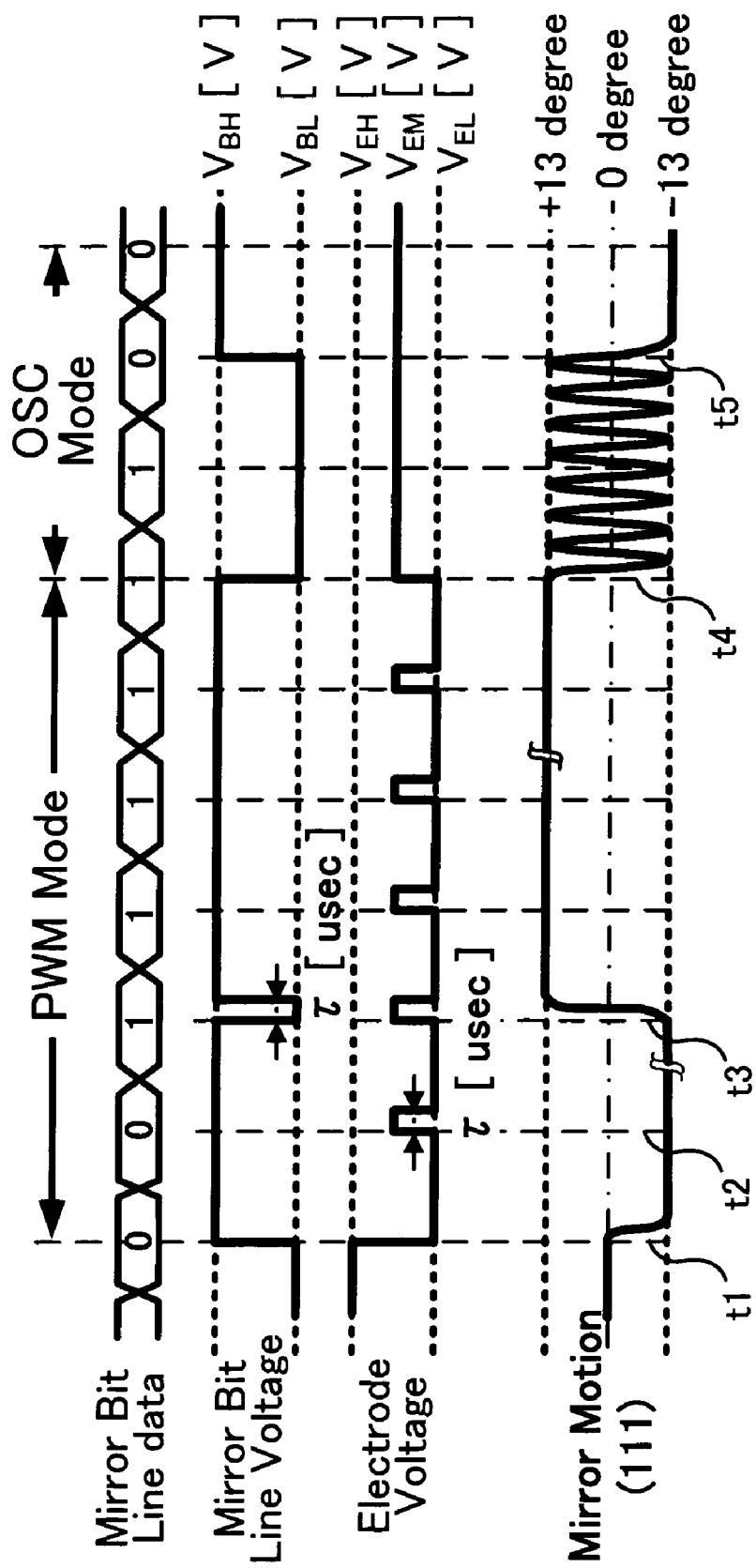
FIG. 15 is a timing diagram showing the correlation between the operation timing of a pixel element shown in FIG. 14 and the behavior of a mirror element.

FIG. 15 is a time graph showing the correlation between the operation timing of a pixel element 110-1 and the behavior of a mirror element 111.

The electrode plate line 132 of the pixel element 110-1 shown in FIG. 14A is connected to both the ON electrode 115 and OFF electrode 116. In contrast, for the pixel element 110-1 shown in FIG. 14, the electrode plate line 132a is connected to the ON electrode 115 and the electrode plate line 132b is connected to the OFF electrode 116.

In both cases shown in FIGS. 14A and 14B, the electrode plate line 132 controls the voltage applied to the ON electrode 115 and OFF electrode 116, thereby changing the moving speed (i.e., the tilting speed) of mirror element 111. Furthermore, the electrode plate line 132 changes the applied voltages so as to prevent sticking between the mirror element 111 and ON electrode 115 (and OFF electrode 116).

As shown in FIG. 15, a mirror bit line voltage $V_{BH}$ is applied (at the control timing t1 that is the start point of a PWM control period) when the mirror element 111 is in the horizontal state (at 0 degrees), i.e., the initial state, and the mirror element 111 is attracted to the OFF side (i.e., −13 degrees) since the electrode area of the OFF electrode 116 is larger than that of the ON electrode 115.

The electrode voltage at the control timing t1 is shifted from voltage $V_{EH}$ to $V_{EL}$, while the electrode voltage from the control timings t2 through t4 is shifted from the voltage $V_{EL}$ to an intermediate voltage $V_{EM}$ for a period of time τ [μsec] in a certain cycle. Furthermore, at the control timing t4 and thereafter, the electrode voltage remains at the intermediate voltage $V_{EM}$.

Then, at the control timing t3, at which the mirror bit line data is loaded from 0 to 1, the mirror bit line voltage is lowered to the GND level voltage $V_{BL}$ only for the period of time τ [μsec].

Simultaneous with the lowering of the bit line voltage, during the period of time τ [μsec], the electrode voltage is also shifted to the intermediate voltage $V_{EM}$, and an electrostatic force sufficient to attract the mirror element 111 is not generated. However, the mirror element accordingly moves from the OFF side to the initial state and further to the ON side (i.e., +13 degrees) due to the reaction. Then, when the mirror element 111 is tilted to the ON side (when the time τ[μsec] has elapsed), a mirror bit line voltage $V_{BH}$ is applied once again. With this operation, the distance from the mirror element 111 becomes smaller with the ON electrode 115 than with the OFF electrode 116, and, therefore, the mirror element 111 is attracted by the electrostatic force to the ON side.

Then, when the mirror bit line voltage is lowered to the GND level voltage $V_{BL}$ for a predetermined time period during the period between the control timing t4, which is the start point of an OSC (oscillation) control period, and the control timing t5, no electrostatic force is generated between the mirror element 111 and electrodes. Therefore, the mirror element 111 is shifted to an oscillation state in which it oscillates between the OFF side (i.e., −13 degrees) and ON side (i.e., +13 degrees), instead of being attracted to either the ON electrode 115 or OFF electrode 116.

Then, when a mirror bit line voltage $V_{BH}$ is applied to the mirror element 111, once again at the control timing t5, at which the mirror bit line data is loaded from 1 to 0, the mirror element 111 is attracted by the electrostatic force to the OFF side since the electrode area of the OFF electrode 116 is larger than that of the ON electrode 115.

An auxiliary use of the intermediate voltage $V_{EM}$ of the electrode voltage, as shown in the timing chart of FIG. 15, makes it possible to lower the setup value of the mirror bit line voltage $V_{BH}$ when the deflection state of the mirror element 111 is shifted. It is therefore possible to speed up the driving of the mirror element 111. Furthermore, the changing of the applied voltages to the electrodes cyclically in the respective deflection state of the mirror element 111 makes it possible to prevent the mirror element 111 from sticking to either the ON electrode 115 or OFF electrode 116.

Figure 16A:
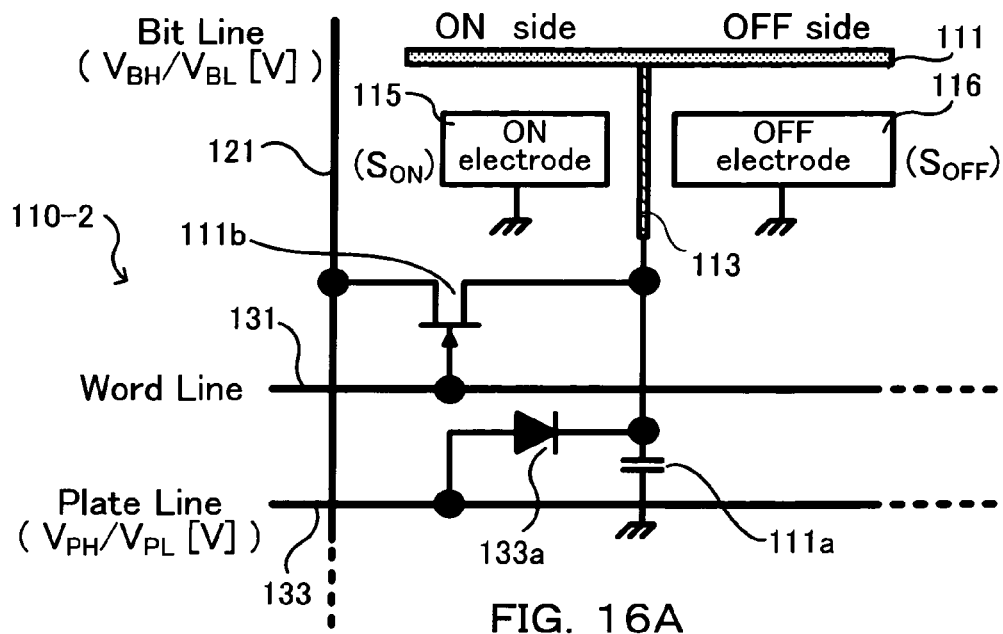
FIG. 16A is a cross sectional view for showing a circuit diagram of a diode connecting the pixel element shown in FIG. 12 to a mirror plate line used for driving a mirror element.
Figure 16B:
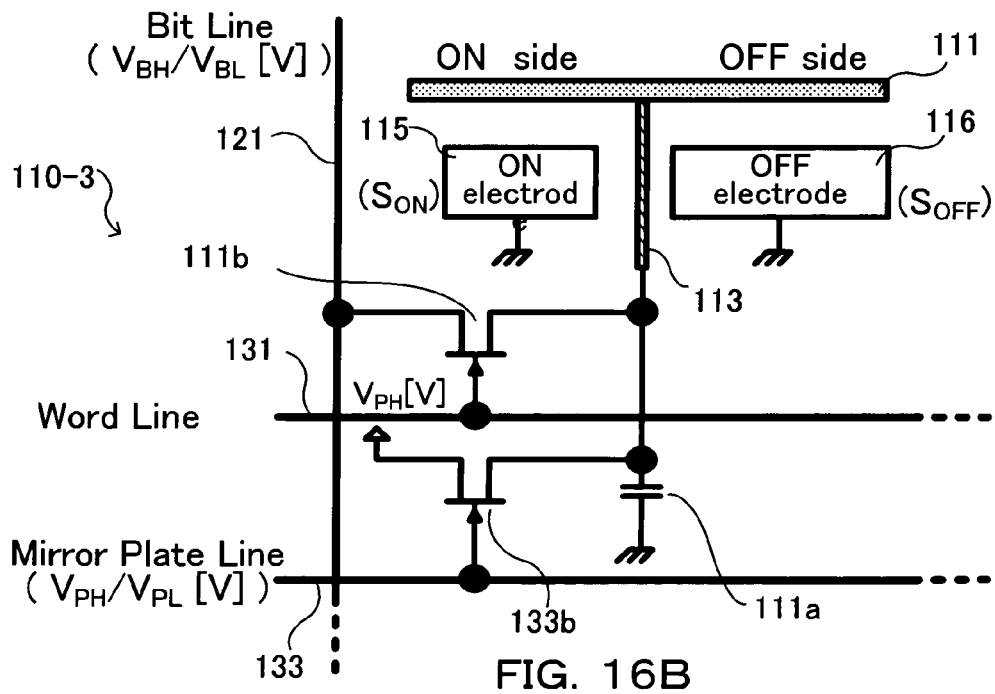
FIG. 16B is a cross sectional view for showing a circuit diagram of the transistor connecting the pixel element shown in FIG. 12 to a mirror plate line used for driving a mirror element.

FIGS. 16A and 16B are outline diagrams illustrating, respectively, a diode connecting and transistor connecting the pixel element 110, shown in FIG. 12, to a mirror plate line 133, which used for driving a mirror element 111.

The connection of the mirror plate line 133 may use a passive element such as a capacitor, in addition to using an active element, such as the diode 133a of the pixel element 110-2 shown in FIG. 16A and the transistor 133b of the pixel element 110-3 shown in FIG. 16B.

Figure 17:
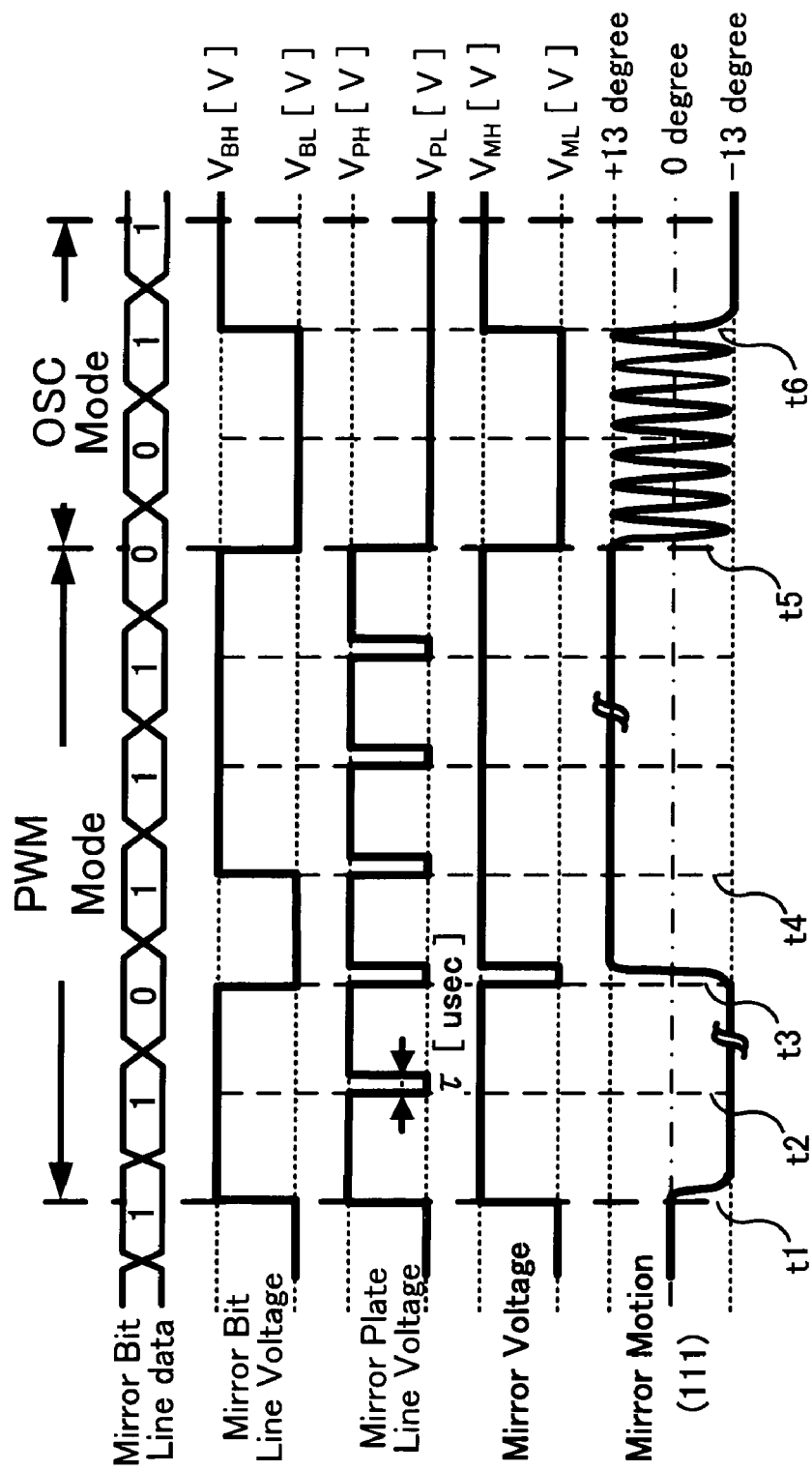
FIG. 17 is a timing diagram for showing the correlation between the operation timing of a pixel element shown in FIG. 16A and the behavior of a mirror element.

FIG. 17 is a time graph showing the correlation between the operation timing of the pixel element 110-2 connected to the mirror plate line 133 and the behavior of the mirror element 111.

As shown in FIG. 17, starting from the control timings t1 through t5, the mirror plate line voltage is shifted from a voltage $V_{PH}$ to the GND level voltage $V_{BL}$ for the period of time τ in a certain cycle, by virtue of the connection via diode 133a.

First, at t1, associated with the mirror bit line voltages being raised from the GND level voltage $V_{BL}$ to the voltage $V_{BH}$, the mirror voltages are shifted from voltages $V_{ML}$ to $V_{MH}$, so that the mirror element 111 is attracted to the OFF side (i.e., −13 degrees). More specifically, $V_{BH}=V_{MH}$ and $V_{BL}=V_{ML}$ in FIG. 17.

Then, between t3 and t4, the mirror bit line voltage is lowered to the GND level voltage $V_{BL}$. At t3, associated with the mirror plate line voltage shifting to the GND level voltage $V_{PL}$ for the period of time τ, the mirror voltage is also lowered to the GND level voltage $V_{BL}$ for the period of time τ starting from t3.

In this event, electrostatic force is not generated in the mirror element 111, and, therefore, it moves from the OFF side to the initial state (and further to the ON side due to reaction). Then, when the mirror element is tilted to the ON side (i.e., when the time τ [μsec] has elapsed), the mirror plate line voltage is returned to the voltage $V_{PH}$, applying a voltage $V_{MH}$ to the mirror element 111 once again. Thereby the mirror element 111 is attracted by the electrostatic force to the ON side.

Between t5, which is the start point of an OSC (oscillation) control period, and t6, the mirror bit line voltage is shifted to the GND level voltage $V_{BL}$ and the mirror plate line voltage is shifted to the GND level voltage $V_{PL}$. Thereby the mirror element 111 is controlled under an oscillation state, oscillating between the ON state (i.e., +13 degrees) and OFF state (i.e., −13 degrees).

Then, at t6, the mirror bit line voltage is raised to a voltage $V_{BH}$, and the mirror element 111 is thereby attracted by electrostatic force to the OFF side.

According to the time graph shown in FIG. 17, it is possible to prevent the time for loading the bit line data from being constrained by the time τ because the mirror plate line voltage, not a mirror bit line voltage, is lowered for the duration of time τ.

Figure 18:
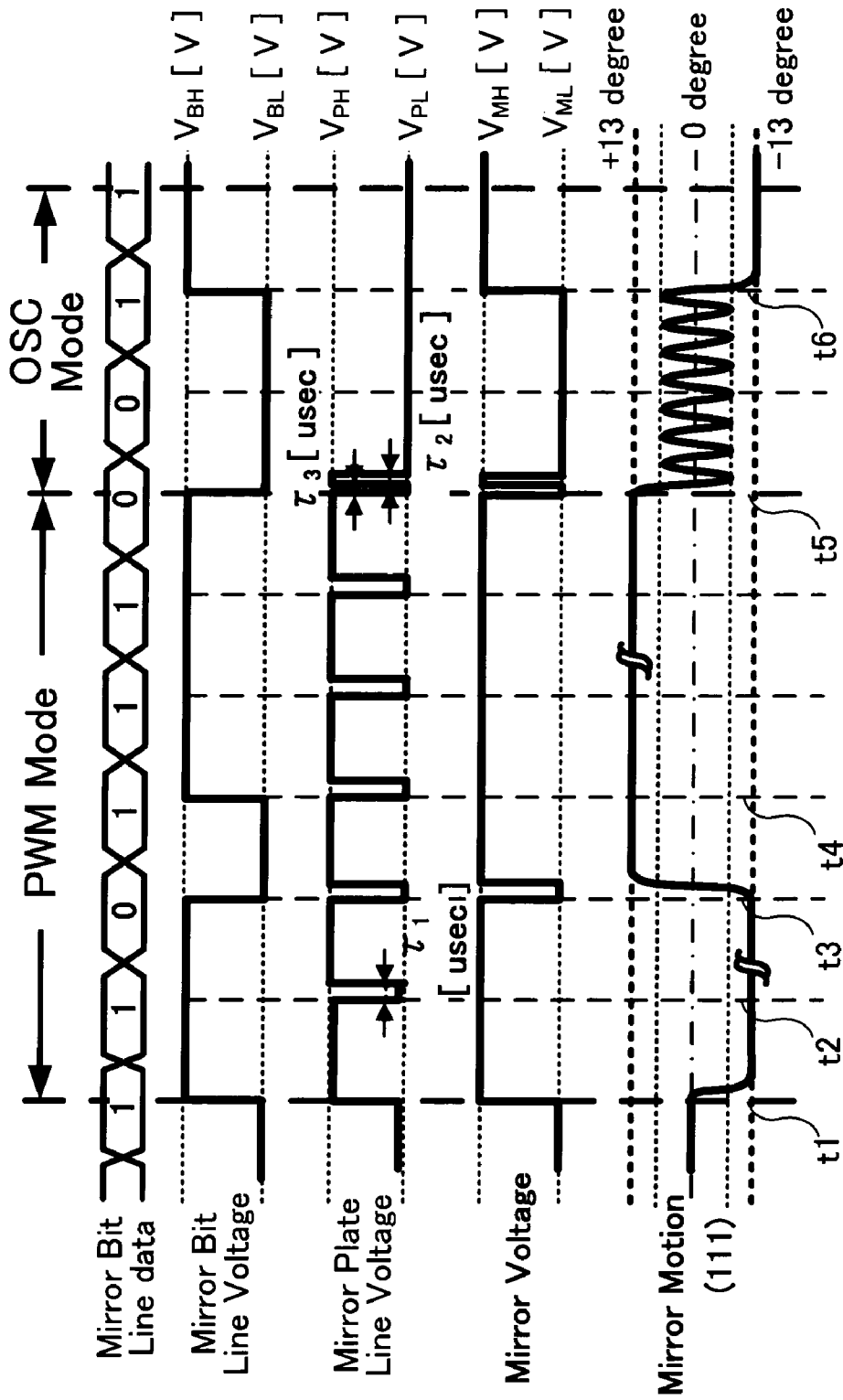
FIG. 18 is an exemplary modification of the timing diagram shown in FIG. 17.

FIG. 18 is an example modification of the time graph shown in FIG. 17.

In the time graph shown in FIG. 18, after time τ3 [μsec] has elapsed after control timing t5, which is the start point of an OSC (oscillation) control period, the mirror plate line voltage is returned to the voltage $V_{PH}$ for the period of time τ2 [μsec]. With this operation, the oscillation state of the mirror element 111 is shifted to an intermediate oscillation, oscillating at amplitude that is smaller than the amplitude of oscillation between the ON side (i.e., +13 degrees) and OFF side (i.e., −13 degrees), according to the time graph shown in FIG. 17. This intermediate oscillation of the mirror element 111 enables minute adjustment of the light volume.

More specifically, the time τ1, τ2, and τ3 are basically determined by the resonance frequency of the hinge 113 and the voltage applied to the mirror element 111, and, if the electrical resistance values of the hinge 113 and mirror element 111a are not substantially low, the aforementioned times are determined in consideration of these properties, as in the case of the above described time τ.

Furthermore, time τ1, shown in FIG. 18, is the same as the time τ shown in FIG. 17 and is therefore set at shorter than the minimum control period of the mirror and also at less than one half (½) times the oscillation cycle of the mirror.

Additionally, time τ3 is set at ½ times the oscillation cycle of the mirror element 111, while time τ2 is set in accordance with the oscillation amplitude (i.e., the oscillation angle) in the intermediate oscillation.

Second Embodiment

The present embodiment is configured to have mutually different electrode areas between an ON electrode 215 and an OFF electrode 216, and to differentiate the electric potential (noted as "potential" hereafter) between the aforementioned two electrodes. These are configurations of the present embodiment that differ from those of the first embodiment; otherwise, both configurations are the same and therefore a duplicate description is not provided here.

FIGS. 19A, 19B, and 19C are the top view, front view, and right side view diagrams each showing a mirror element and electrodes according to the second preferred embodiment of the present invention.

An ON electrode 215 and an OFF electrode 216 are placed, with a hinge 213 sandwiched between the two electrodes, under one mirror element (i.e., an address mirror) 211 that tilts freely and is supported by the hinge 213.

As shown in FIGS. 19A and 19B, the ON electrode 215 and OFF electrode 216 each have the same area. While described in detail later, the electrodes are at different potentials. With this configuration, the electrostatic force generated between a mirror element 211 and the respective electrodes, i.e., ON electrode 215 and OFF electrode 216, are mutually different when a voltage is applied to the mirror element 211.

Figure 20:
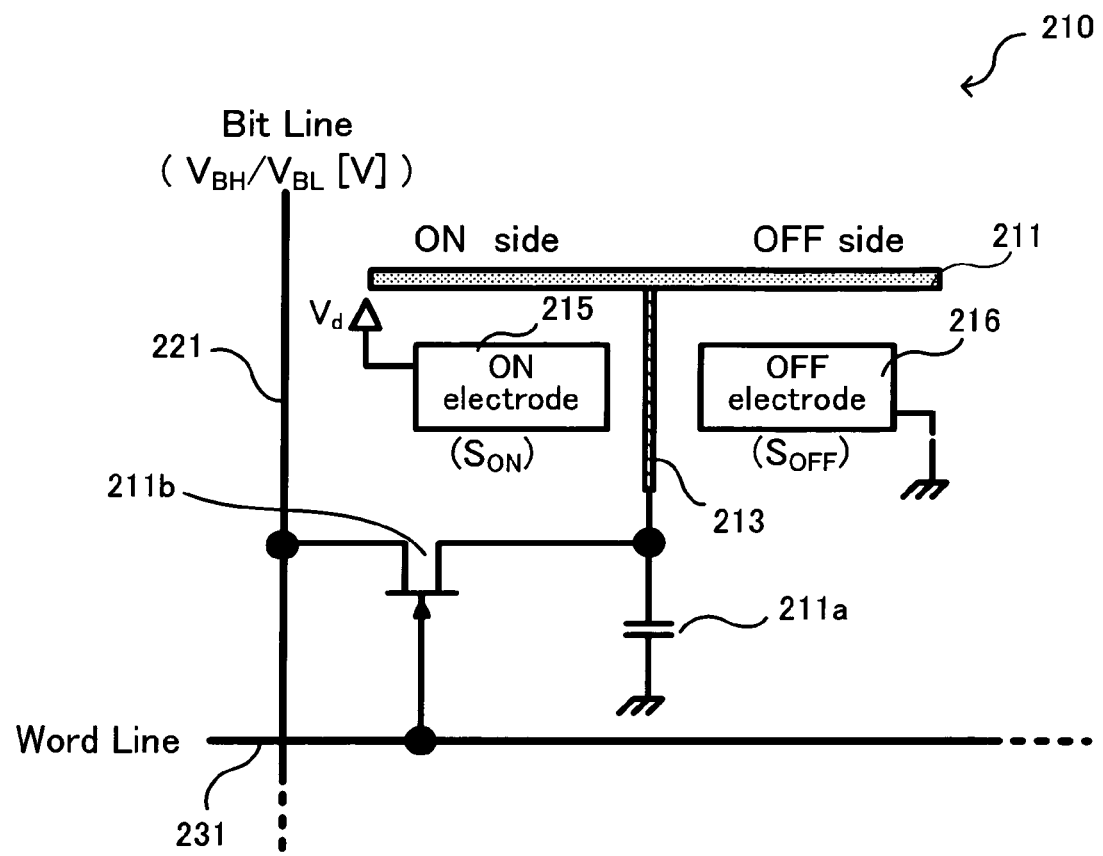
FIG. 20 is a cross-sectional view for showing a circuit diagram of a pixel element according to the second embodiment of the present invention.

FIG. 20 is an outline diagram showing a pixel element 210 according to the present embodiment.

The pixel element 210 shown in FIG. 20 is similar to the pixel element 110 shown in FIG. 12, except where a certain voltage Vd is applied to the ON electrode 215.

In contrast to a certain voltage Vd being applied to the ON electrode 215, the OFF electrode 216 is grounded.

A capacitor 211a is connected to the mirror element 211, and the capacitor 211a is connected to a bit line 221 by way of a gate transistor 211b constituted by a field effect transistor (FET) or the like.

The opening and closing of the gate transistor 211b is controlled via the word line 231.

Specifically, the single horizontal row of the mirror elements 211 lined up with an arbitrary word line 231 is simultaneously selected, and the charging and discharging of the electric charge to and from the capacitor 211a is controlled via the bit line 211, and thereby the ON/OFF state of each mirror element 211 of each of the pixel elements 210 is lined up on the present single row.

Specifically, the capacitor 211a and gate transistor 211b constitute a so-called DRAM-structured memory cell.

With this configuration, the tilting operation for the mirror element 211 is controlled in accordance with, for example, the presence or absence of data written to the memory cell.

Figure 21:
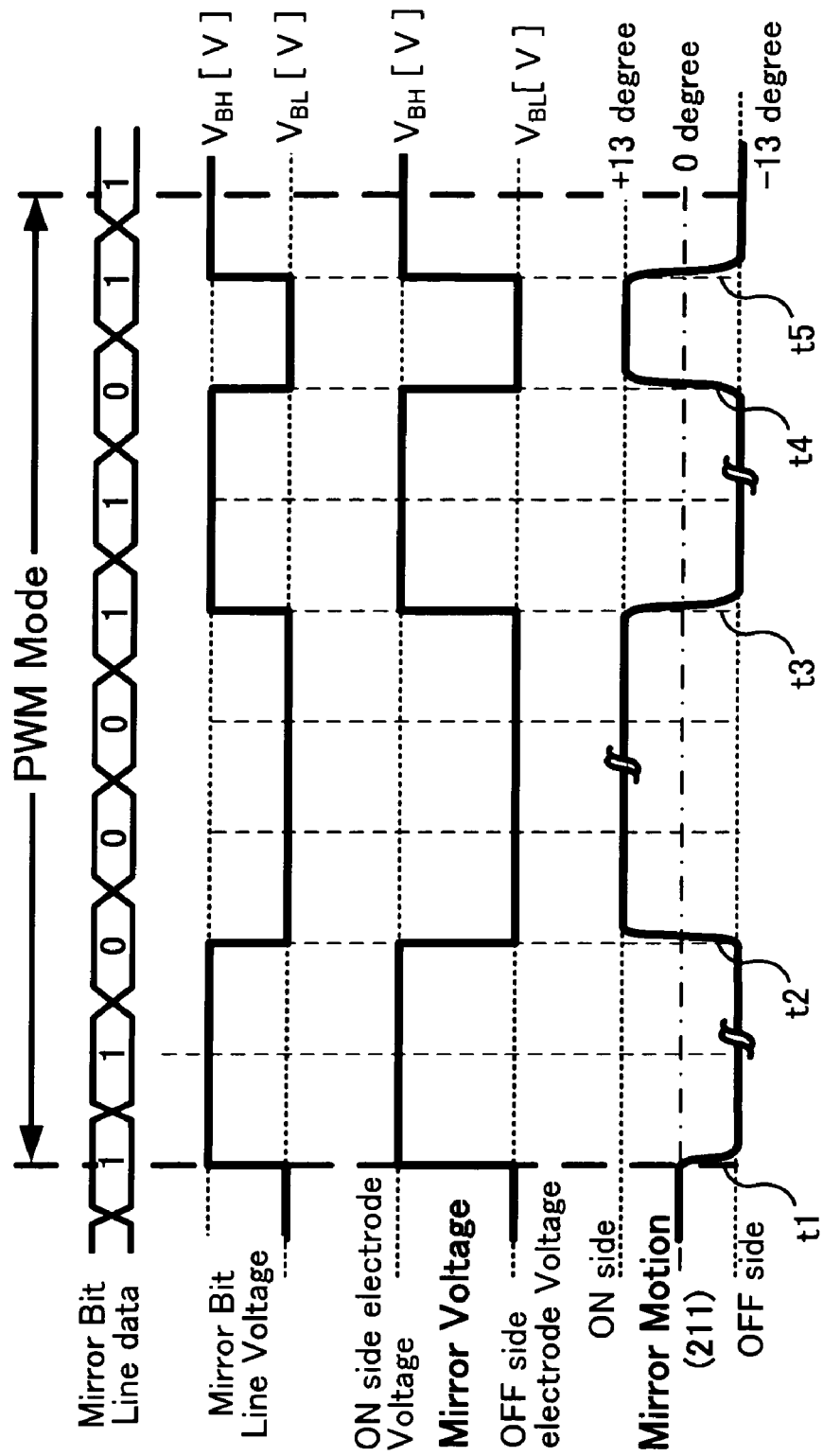
FIG. 21 is a timing diagram for showing the correlation between the operation timing of a pixel element shown in FIG. 20 and the behavior of a mirror element.

FIG. 21 is a time graph showing the correlation between the operation timing of the pixel element 210 and the behavior of the mirror element 211.

Since only the OFF electrode 216 is grounded, when a mirror bit line voltage $V_{BH}$ is applied to the mirror element 211 to shift the mirror voltage to a voltage $V_{BH}$, and the mirror element 211 is in the initial horizontal state at operation timing t1, which is the start point of a PWM control period, the difference in potentials between the mirror element 211 and the OFF electrode 216 is larger than that between the mirror element 211 and the ON electrode 215, and it is therefore attracted by the electrostatic force to the OFF side (i.e., −13 degrees).

Likewise, as with t3 and t5, when the mirror bit line voltage is applied, raising the mirror voltage to $V_{BH}$, the mirror element 211 is attracted by the electrostatic force to the OFF side.

In contrast, at t2 and t4, the mirror bit line voltage is lowered to the GND level voltage so that the mirror voltage reaches the GND level voltage $V_{BL}$, so that the difference in potentials between the mirror element 211 and ON electrode 215 becomes larger than the difference in potentials between the mirror element 211 and OFF electrode 216, and therefore the mirror element 211 is attracted to the ON side (i.e., +13 degrees).

Figure 22:
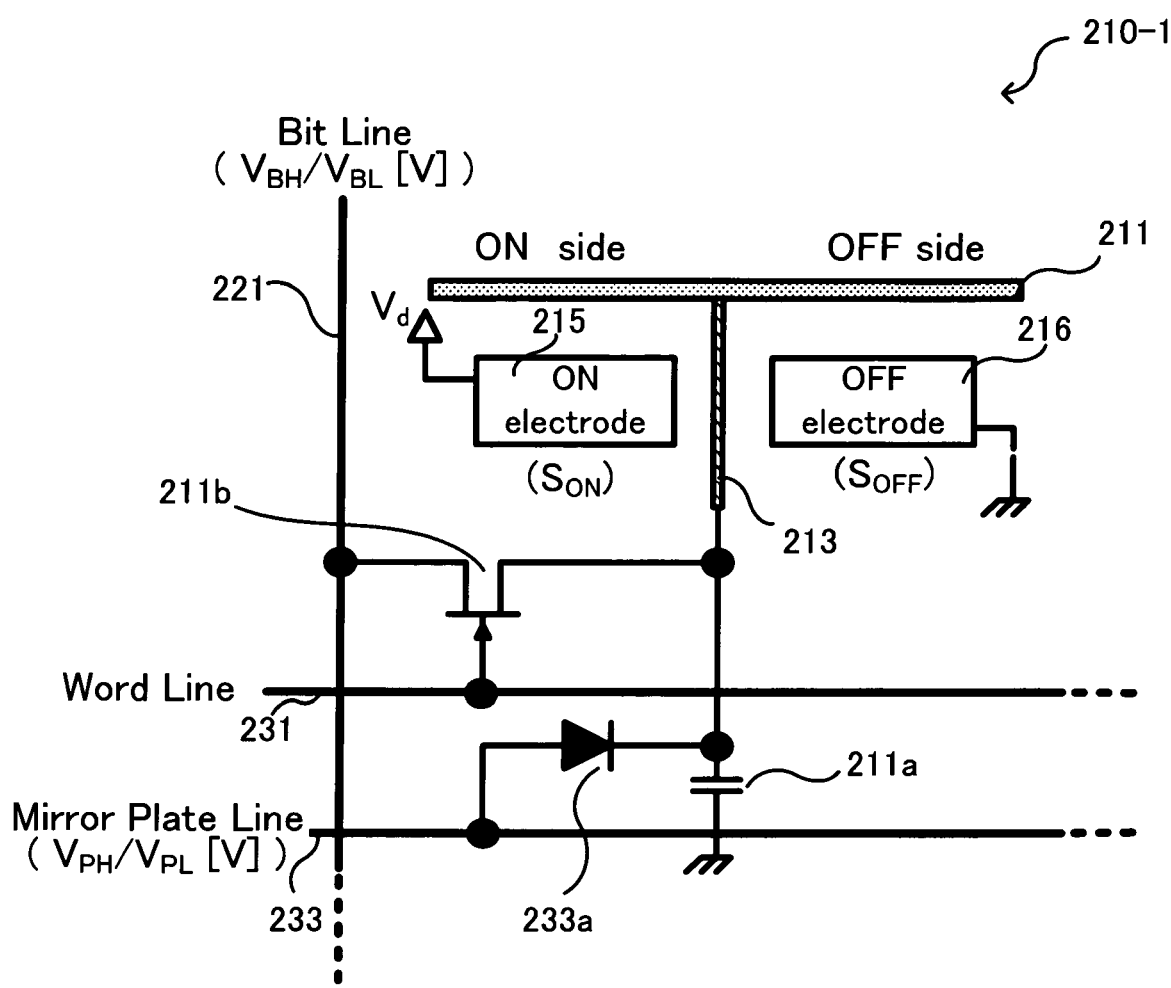
FIG. 22 is a cross sectional view for showing a circuit diagram of a pixel element that connects via diode a mirror plate line for driving a mirror element of the pixel element shown in FIG. 20.

FIG. 22 is an outline diagram illustrating a pixel element 210-1 that connects via diode a mirror plate line 233 used for driving the mirror element 211 to the pixel element 210.

Figure 23:
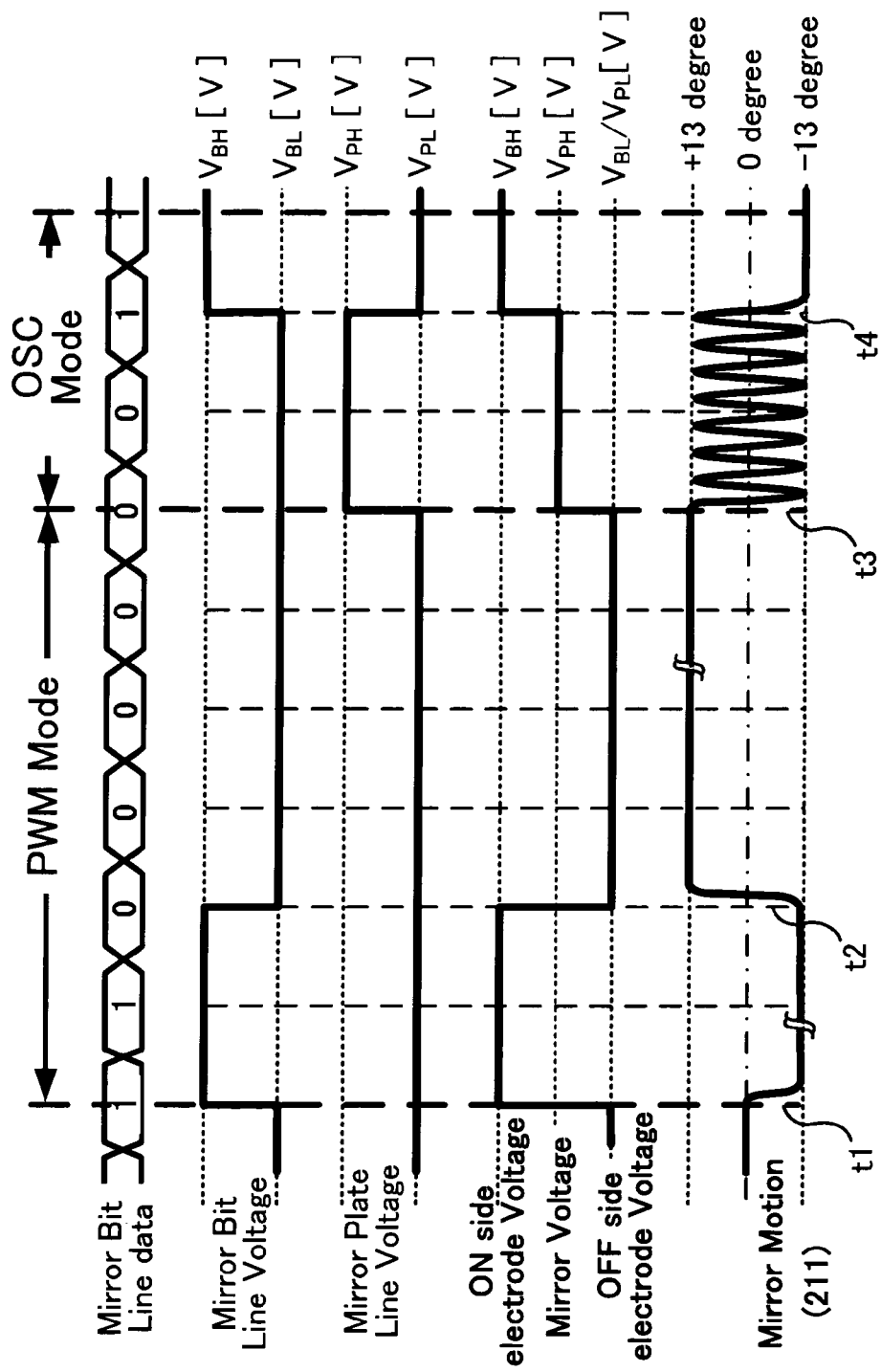
FIG. 23 is a timing diagram for showing the correlation between the operation timing of a pixel element shown in FIG. 22 and the behavior of a mirror element.

FIG. 23 is a time graph showing the correlation between the operation timing of a pixel element 210-1 and the behavior of the mirror element 211.

A certain voltage Vd is applied to the ON electrode 215, and the OFF electrode 216 is grounded (i.e., set at GND level), and therefore, when a mirror bit line voltage $V_{BH}$ has the mirror element 211 applied in the initial horizontal state (at t1, which is the start point of a PWM control period), the mirror element 211 is attracted to the OFF side (i.e., −13 degrees) as described above.

Then, at t2, when the mirror bit line voltage is lowered to the GND level voltage $V_{BL}$, the mirror element 211 is attracted to the ON side (i.e., +13 degrees) because the difference in potentials between the mirror element 211 and ON electrode 215 is larger than the difference between the mirror element 211 and OFF electrode 216.

During the PWM control period (i.e., between t1 and t3), the mirror plate line voltage is controlled at the GND level voltage $V_{PL}$, and then is raised to a voltage $V_{PH}$ at t3, which is the start point of an OSC control period. The voltage $V_{PH}$ in this event is controlled at half the value of the mirror bit line voltage $V_{BH}$.

This operation causes the electrostatic force between the mirror element 211 and ON electrode 215 to be the same as the electrostatic force between the mirror element 211 and OFF electrode 216, shifting the mirror element 211 to an oscillation state oscillating between the ON side (i.e., +13 degrees) and OFF side (i.e., −13 degrees).

If the electrostatic force between the mirror element 211 and ON electrode 215 is set asymmetrically with the electrostatic force between the mirror element 211 and OFF electrode 216 in this event, an asymmetric oscillation is obtained which is offset toward the ON electrode 215 or OFF electrode 216 and which has a smaller amplitude than the oscillation shown in FIG. 23. Such a control enables a more minute adjustment of the light volume by virtue of the aforementioned oscillation of mirror element 211.

Then, at t4, the mirror bit line voltage is raised to $V_{BH}$ and the mirror plate line voltage is lowered to the GND level voltage $V_{PL}$, and the mirror element 211 is thereby attracted to the OFF side.

More specifically, the connection of the plate line 232 may use a passive element, such as a capacitor, provided that it is capable of applying the voltage from the plate line 233 to the mirror element 111, since it is limited to using an active element, such as the diode 232a shown in FIG. 22 or a transistor.

Figure 24:
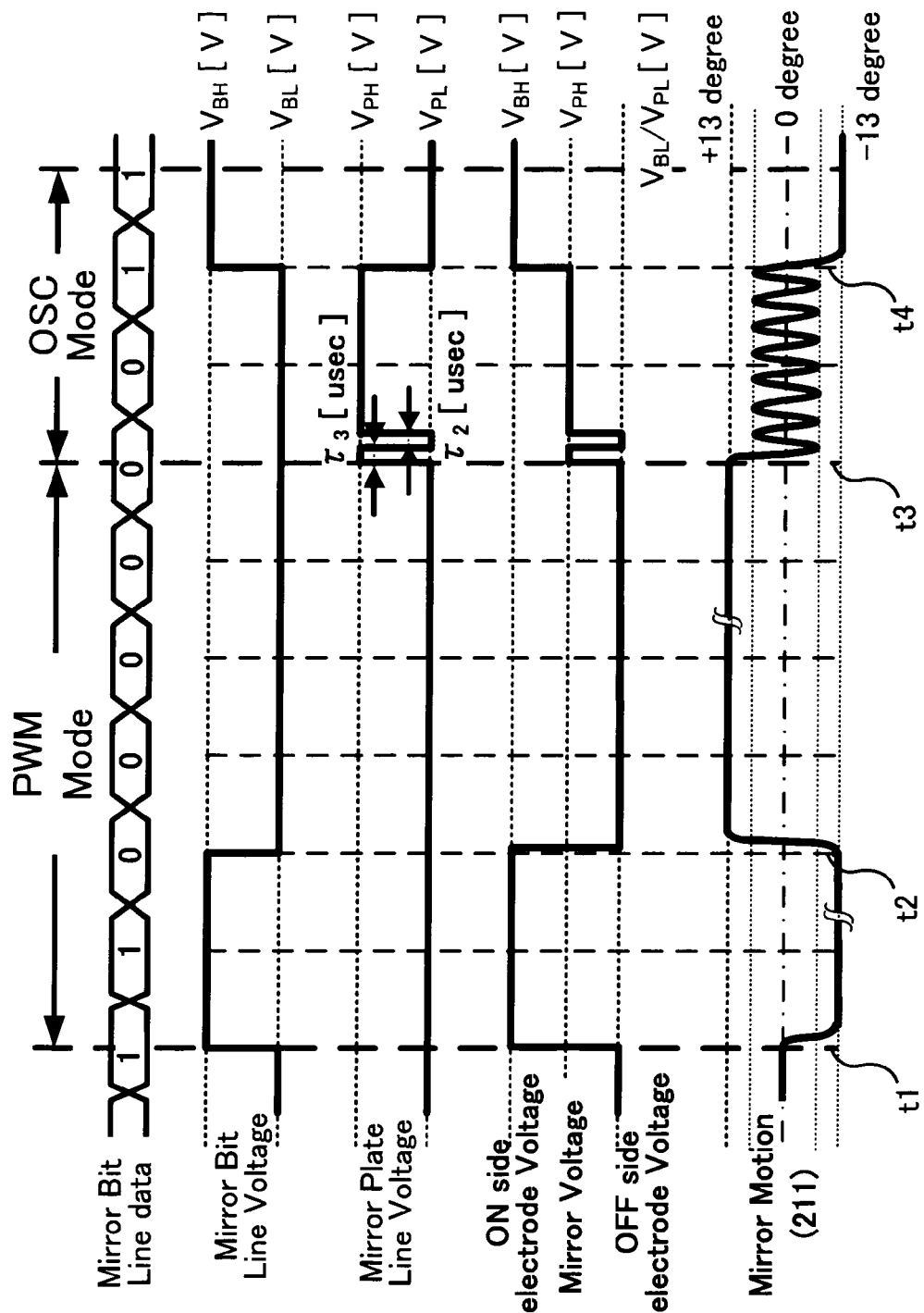
FIG. 24 is an exemplary modification of the timing diagram shown in FIG. 23.

FIG. 24 is an example modification of the time graph shown in FIG. 23.

In the time graph shown in FIG. 24, after the elapse of time τ3 [μsec] from the control timing t3, according to the time graph shown in FIG. 23, the mirror plate line voltage is lowered to the GND level voltage $V_{PL}$ for the period of time τ2 [μsec]. This operation causes the oscillation state of the mirror element 211 to be shifted to an intermediate oscillation at an amplitude smaller than that of in time graph shown in FIG. 23. The intermediate oscillation of the mirror element 211 enables a more minute adjustment of the light volume.

Third Embodiment

The present embodiment differs mainly from the above described first embodiment where the former is configured such that a mirror element 311 has a plurality of regions 312a and 312b that are electrically separated and an ON electrode 315 and an OFF electrode 316 have the same electrode area. Otherwise, both embodiments are approximately similar and, therefore, the duplicate description of the similarity with the above described first embodiment is not provided here.

FIGS. 25A, 25B, and 25C are the top view, front view, and right side view diagrams, each showing a mirror element and electrodes according to the third preferred embodiment of the present invention.

The mirror element 311 comprises an ON-side region 312a and an OFF-side region 312b (noted as "ON region 312a" and "OFF region 312b" hereafter) as a plurality of regions that are electrically separated.

The ON region 312a of the mirror element 311 is opposite to the ON electrode 315 and is connected to memory (which is described later) by way of an ON-side hinge 313a. The OFF region 312b of the mirror element 311 is opposite to the OFF electrode 316 and is connected to memory by way of an OFF-side hinge 313b. More specifically, the ON-side hinge 313a and OFF-side hinge 313b are also electrically separated.

Figure 26:
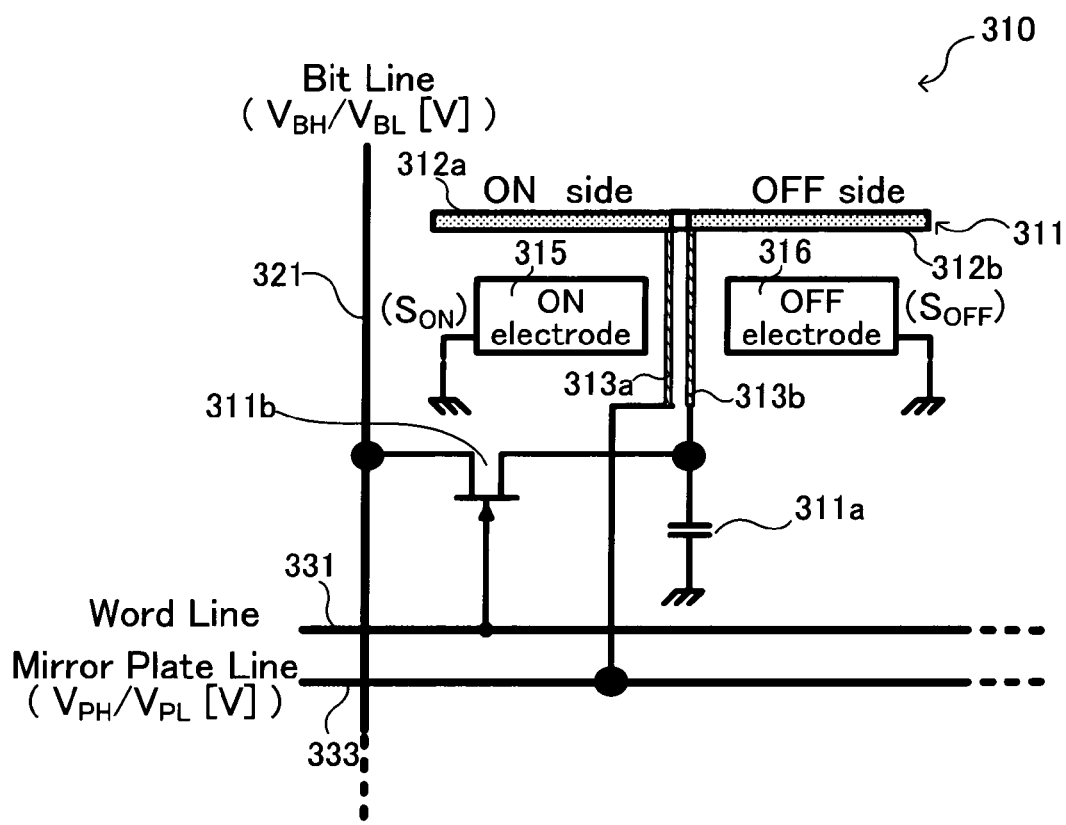
FIG. 26 is a cross sectional view for showing a circuit diagram of a pixel element according to the third embodiment of the present invention.

FIG. 26 is an outline diagram showing a pixel element 310 according to the present embodiment.

As shown in FIG. 26, the pixel elements 310 comprising mirror elements 311 and other components are arrayed in a matrix where vertically extended bit lines 321 and the horizontally extended word lines 331 cross each other.

The mirror element 311 tilts freely and is supported by a substrate (not shown in a drawing here) by way of the ON-side hinge 313 and OFF-side hinge 313b.

On the substrate, the above described ON electrode 315 and OFF electrode 316, of which the areas of the electrodes are the same, are placed with the hinges 313a and 313b sandwiched between the electrodes.

Both the ON electrode 315 and OFF electrode 316 are grounded.

When predetermined voltages are applied to the ON region 312a and OFF region 312b, the mirror element 311 is tilted by the electrostatic force generated between the mirror element 311 and an electrode 315 (or 316) to a position abutting the stopper equipped on the ON side or OFF side. With this operation, incident light incident to mirror element 311 is reflected onto a light path at an ON position, which matches the optical axis of a projection optical system, or to an OFF position shifted from the aforementioned optical axis.

A capacitor 311a is connected to the OFF region 312b of the mirror element 311 and is connected to the bit line 321 by way of a gate transistor 311b constituted by a field effect transistor (FET) or the like. The opening and closing of the gate transistor 311b is controlled through the word line 331. Specifically, the capacitor 311a and gate transistor 311b constitute a so-called DRAM-structured memory cell.

Additionally, the ON region 312a of the mirror element 311 is connected to a mirror plate line 333.

Figure 27:
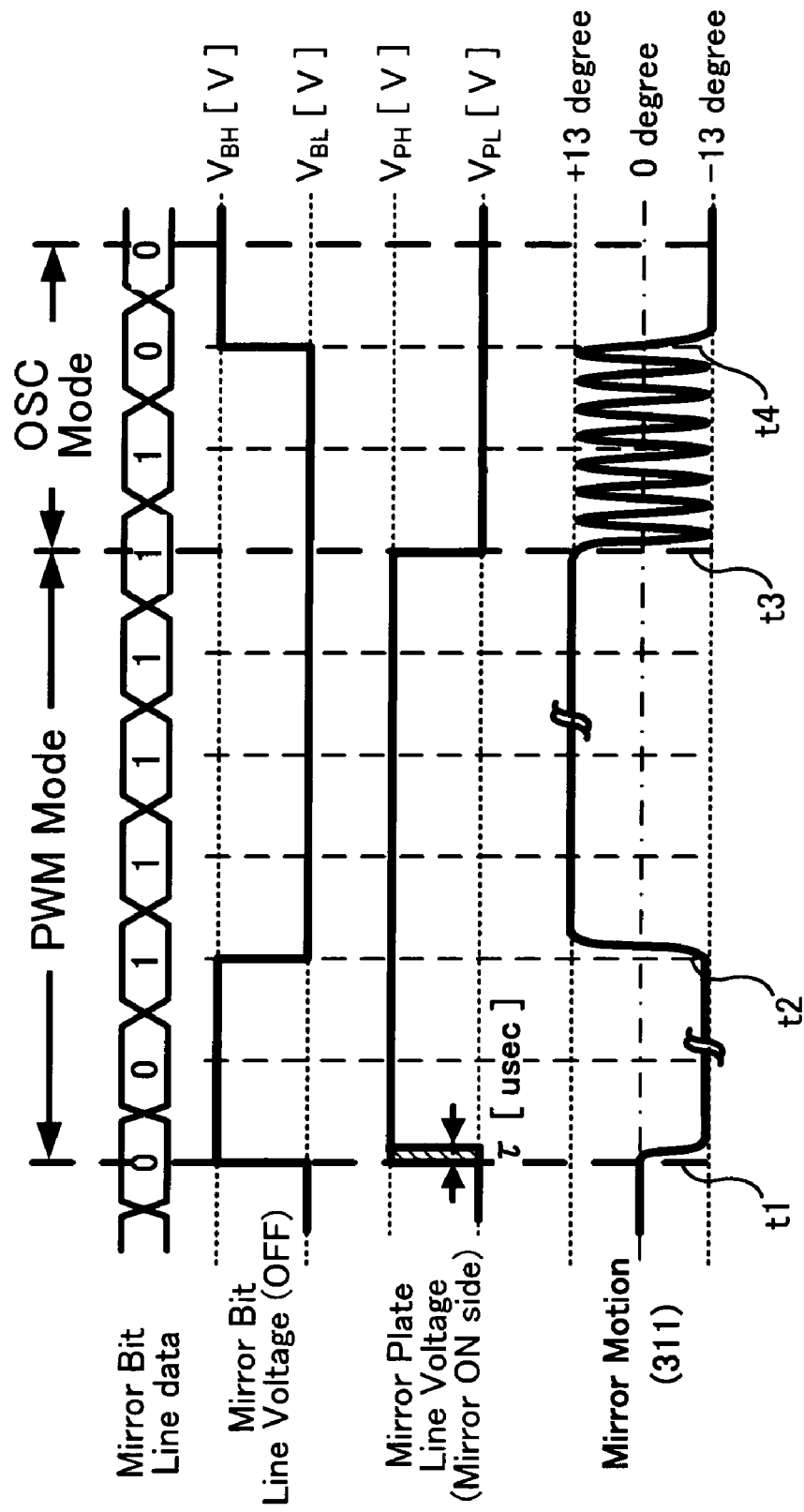
FIG. 27 is a timing diagram for showing the correlation between the operation timing of a pixel element shown in FIG. 26 and the behavior of a mirror element.

FIG. 27 is a time graph showing the correlation between the operation timing of the pixel element 310 and the behavior of the mirror element 311.

When a mirror bit line voltage $V_{BH}$ is applied to the OFF region 312b, and a mirror plate line voltage $V_{PH}$, which is lower than the mirror bit line voltage $V_{BH}$, is applied to the ON region 312a in a state in which the mirror element 311 is in the initial horizontal state, the mirror element 311 is attracted by electrostatic force to the OFF side, on which the difference in potentials is larger (at the control timing t1, which is the start point of a PWM control period). The above description illustrates the control of the tilting direction of the mirror element 311 by the difference in potentials between the ON region 312a and OFF region 312b. An alternative method of control applies a mirror bit line voltage $V_{BH}$ is to the OFF region 312b at control timing t1, and, after the time τ [μsec], as shown in FIG. 27, has elapsed, a mirror plate line voltage $V_{PH}$ is applied to the above described ON region 312a. In this event, it is possible to set mutually the same voltage as the mirror bit line voltage $V_{BH}$ and mirror plate line voltage $V_{PH}$. Incidentally, the time τ [μsec] is a period of time that is no less than the time required to tilt the mirror element 311 to the OFF side.

Then, at t2, the mirror bit line voltage is lowered to the GND level voltage $V_{BL}$.

With this operation, electrostatic force no longer functions between the OFF electrode 316 and mirror element 311, so that it is attracted to the ON side. Then, when the mirror plate line voltage $V_{PH}$ is lowered to the GND level voltage $V_{PL}$ (during the period between t3, which is the start point of an OSC (oscillation) control period, and t4), the mirror element 311 is shifted to an oscillation state oscillating between the ON side (i.e., +13 degrees) and OFF side (i.e., −13 degrees).

Then, when the mirror bit line voltage $V_{BH}$ is applied to the mirror element 311 once again (at t4), the mirror element 311 is attracted by the electrostatic force to the OFF side.

Fourth Embodiment

The present embodiment differs mainly from the above described third embodiment where the former is configured such that bit lines 421-1 and 421-2 are connected to ON region 412a and OFF region 412b, respectively, of a mirror element 411. Otherwise, both configurations are approximately similar to each other, and therefore a duplicate description of the similar portions is not provided here.

FIGS. 28A, 28B, and 28C are the top view, front view, and right side view diagrams, each showing the mirror element 411 and electrodes 415 and 416 according to the fourth preferred embodiment of the present invention. Specifically, the electrodes 415 and 416 are formed stepwise, as though going down a set of steps, starting from the part of the mirror element 411 supported and connected by the hinges 413a and 413b to the edges of the mirror element 411. Specifically, both electrodes 415 and 416 comprise a stepwise electrode surface. This configuration secures the desired tilting angle of the mirror element while keeping the area of the electrodes 415 and 416 at its maximum, making it possible to generate effectively an electrostatic force between mirror element 411 and electrode 415 (and 416). Therefore, while the present electrodes 415 and 416 are 2-step in form, a multiple-step form may also be used.

Figure 28D:
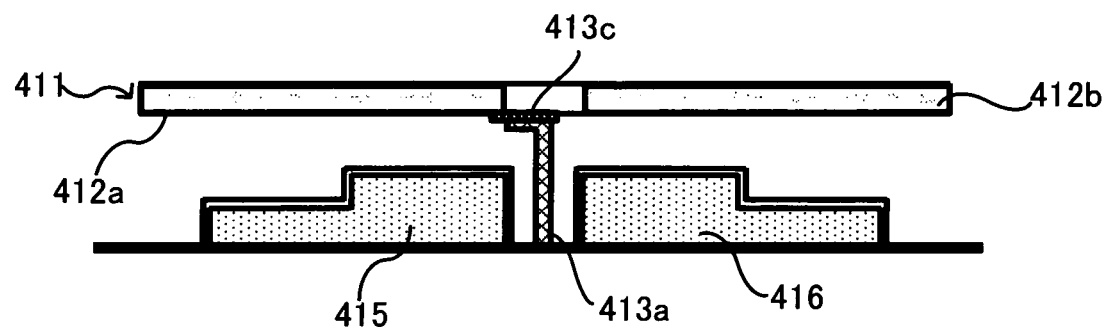
FIG. 28D is a front view diagram showing a mirror element and electrodes according to an exemplary modification of the fourth embodiment of the present invention.
Figure 28E:
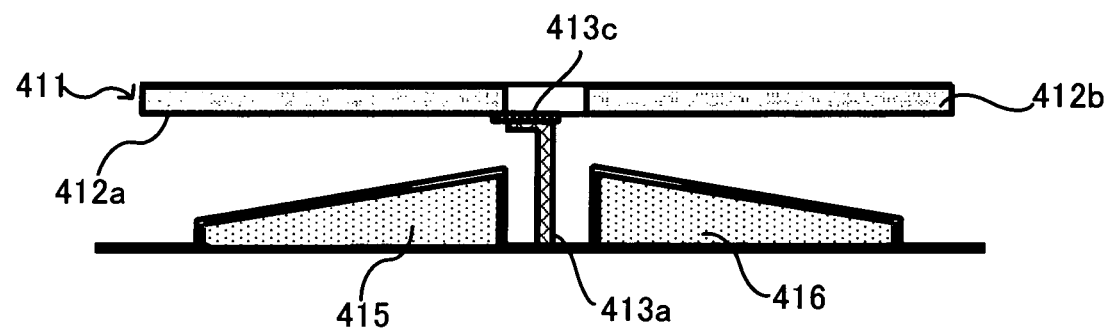
FIG. 28E is a front view diagram showing a mirror element and electrodes according to another exemplary modification of the fourth embodiment of the present invention.

Furthermore, as shown in FIG. 28E, forming the electrodes 415 and 416 as a uniform slope (i.e., a taper) in which the height attained by each electrode steadily declines starting from the part supported by the hinges 413a and 413b (which is not shown here) to the edges of the mirror element 411, that is, forming the electrodes 415 and 416 so as to comprise sloped electrode surfaces, makes it possible to generate the electrostatic force more effectively. More specifically, while it is described in detail later, the example shown in FIG. 28E also differs from the configuration shown in FIGS. 28A through 28C in that the former is equipped with a joinder part 413c between the mirror element 411 and hinges 413a (and 413b).

The mirror element 411 comprises the ON region 412a and OFF region 412b as electrode regions that are electrically separated.

The ON region 412a of the mirror element 411 is opposite to the ON electrode 415 and is connected to memory (which is described later) by way of the ON-side hinge 413a. Additionally, the OFF region 412b of the mirror element 411 is opposite to the OFF electrode 416 and is connected to memory by way of the OFF-side hinge 413b. More specifically, the ON-side hinge 413a and OFF-side hinge 413b are also electrically separated.

Incidentally, instead of equipping the ON region 412a and OFF region 412b of the mirror element 411 with the hinges 413a and 413b, respectively, a single hinge may be equipped with two electrically separated regions by providing different layers with electrically conductive metallic film layers. Furthermore, in the case of using a hinge(s) with electrical conductivity, a joinder part 413 made of a metallic material, or the like, possessing a high affinity with the material in the mirror element 411 and hinges 413a and 413b may be equipped between the mirror element 411 and hinge 413a (and 413b) as shown in FIGS. 28D and 28E. This configuration enforces the strength of the joinder between the mirror element 411 and hinge 413a (and 413b), thereby improving reliability. More specifically, the joinder part on the side the OFF electrode 416 is placed is not drawn in FIG. 28D or 28E.

Specifically, the configurations shown in FIGS. 28A through 28E have the same area and the same distance between electrodes for the ON region 412a and OFF region 412b, whereas different configurations are possible, such as differentiating the areas of the ON region 412a and OFF region 412b, or projecting one side of the mirror element 411 downward or differentiating the heights of the electrodes 415 and 416, thereby making the distance between the mirror element 411 and opposite electrodes 415 (and 416) for the ON region 412a different from the aforementioned distance for the OFF region 412b as illustrated in FIG. 10D through 10F.

Figure 29A:
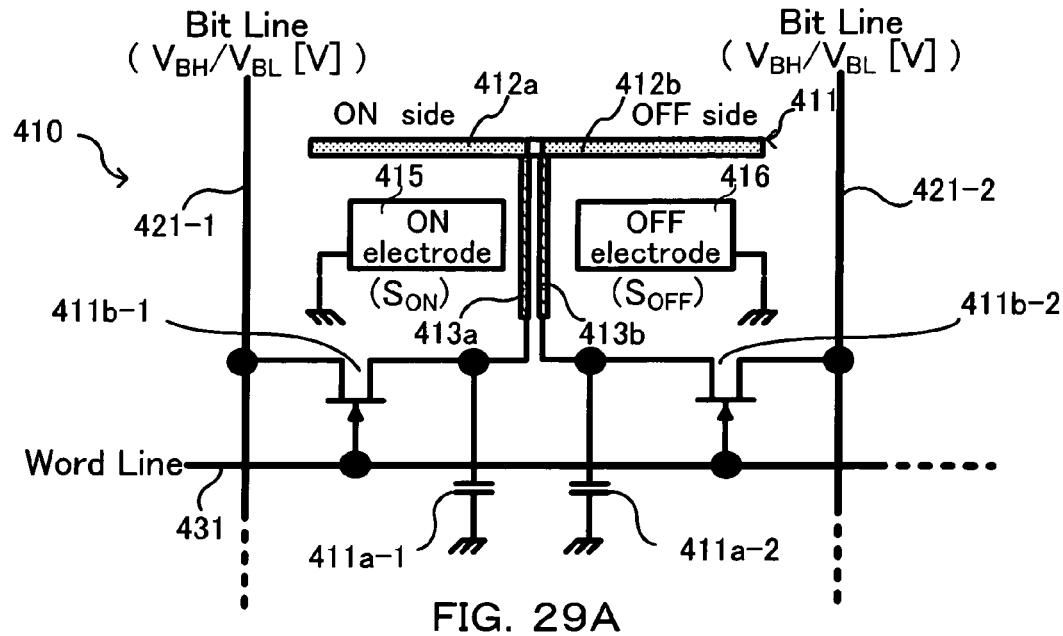
FIG. 29A is an outline diagram showing a pixel element comprising DRAM according to the fourth embodiment of the present invention.

FIG. 29A is an outline diagram showing a pixel element 410 according to the present embodiment.

As shown in FIG. 29, the pixel elements 410, comprising mirror elements 411 and other components, are arrayed in a matrix where two vertically extended respective bit lines 421-1 and 421-2 and the horizontally extended word lines 431 cross each other.

The mirror element 411 tilts freely and is supported by a substrate (not shown in a drawing here) by way of the ON-side hinge 413a and OFF-side hinge 413b.

On the substrate, the ON electrode 415 and OFF electrode 316, of which the areas of the electrodes are the same, are placed with the hinges 413a and 413b sandwiched between the electrodes.

Both the ON electrode 415 and OFF electrode 416 are grounded.

When predetermined voltages are applied to the ON region 412a and OFF region 412b, the mirror element 411 is tilted to a position abutting the stopper equipped on the ON side or OFF side by the electrostatic force generated between the respective regions 412a (and 412b) and an electrode 415 (and 416).

With this operation, incident light incident to the mirror element 411 is reflected onto a light path at an ON position, which matches the optical axis of a projection optical system, or at an OFF position shifted from the aforementioned optical axis.

Capacitors 411a-1 and 411a-2 are respectively connected to the ON region 412a and OFF region 412b of the mirror element 411, and are connected, respectively, to mutually different bit lines 421-1 and 421-2 by way of gate transistors 411b-1 and 411b-2, respectively, each of which is constituted by a field effect transistor (FET) or the like.

The opening and closing of gate transistors 411b-1 and 411b-2 are controlled through the word line 431. Specifically, the capacitors 411a-1 (and 411a-2) and gate transistors 411b-1 (and 411b-2), which are connected to the ON region 412a and OFF region 412b, respectively, of the mirror element 411, constitute a DRAM-structured memory, respectively.

Figure 29B:
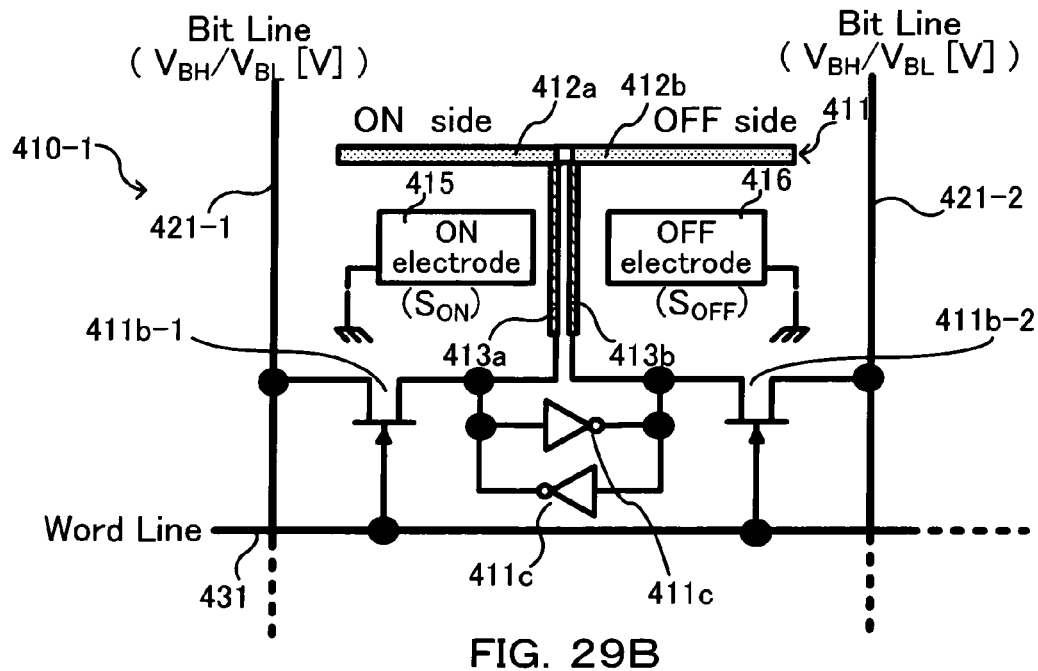
FIG. 29B is an outline diagram showing a pixel element comprising SRAM according to the fourth embodiment of the present invention.

More specifically, the memory is not limited to DRAM, but may be configured as static random access memory (SRAM), in which case the capacitors 411a-1 and 411a-2 may be replaced with inverters 411c and 411c, as in the case of the pixel element 410-1 shown in FIG. 29B.

Figure 30:
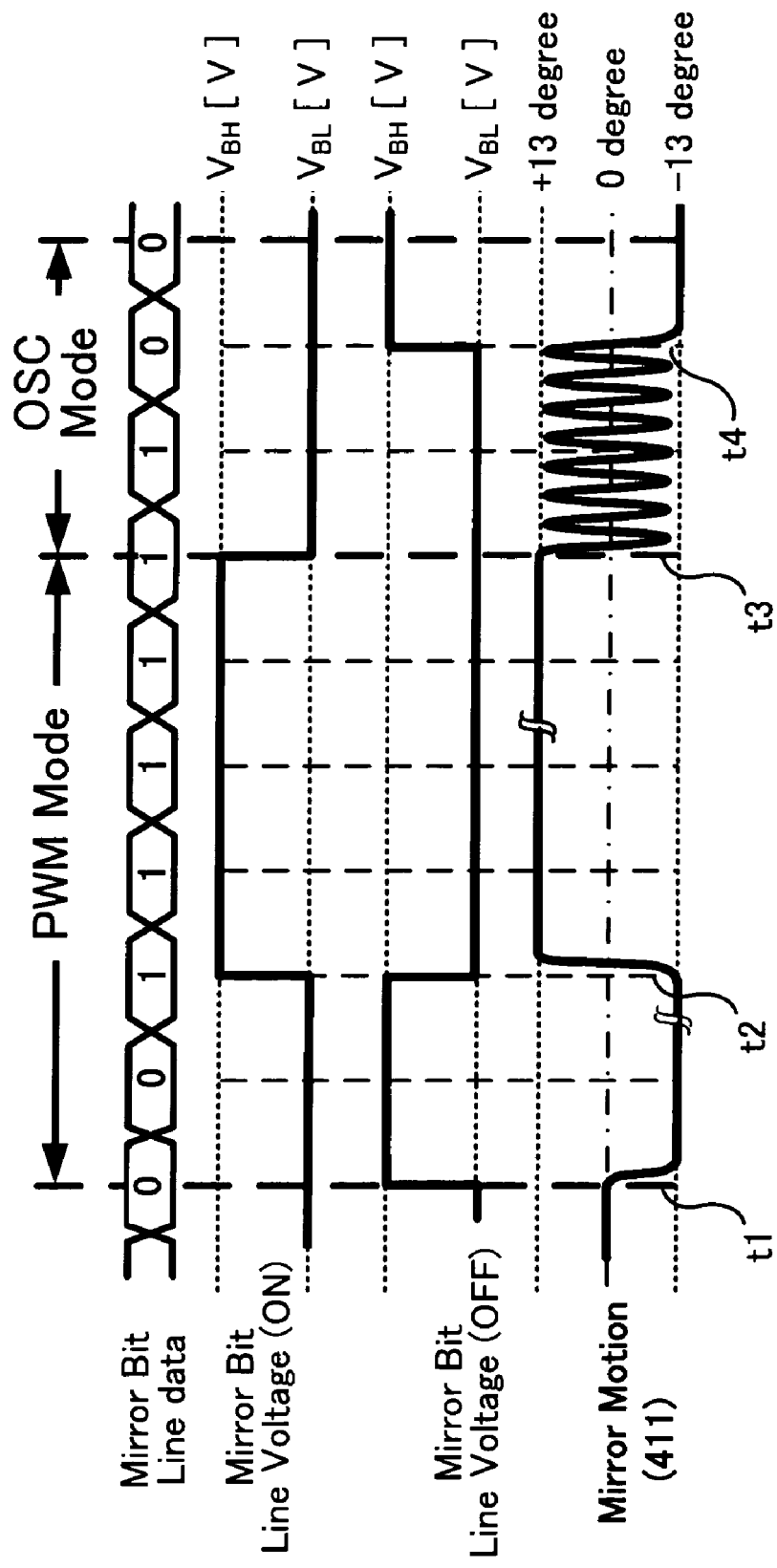
FIG. 30 is a timing diagram for showing the correlation between the operation timing of a pixel element shown in FIG. 29A and the behavior of a mirror element.

FIG. 30 is a time graph showing the correlation between the operation timing of a pixel element 410 and the behavior of the mirror element 411.

When a mirror bit line voltage $V_{BH}$ is applied to the OFF region 412b in the horizontal state (i.e., 0 degrees), which is the initial state of the mirror element 411, it is attracted by electrostatic force to the OFF side (i.e., −13 degrees) on which the difference in potentials is large (at control timing t1, which is the start point of a PWM control period).

Then, at t2, the mirror bit line voltage of the ON side is raised to a voltage $V_{BH}$, and the mirror element 411 is thereby attracted to the ON side (i.e., +13 degrees) where the difference in potentials is large.

Then, when the mirror bit line voltage of the ON side is also lowered to the GND level voltage $V_{BL}$ (in the period between t3, which is the start point of an OSC control period, and t4), electrostatic force between the mirror element 411 and ON electrode 415 or electrostatic force between the mirror element 411 and OFF electrode 416 no longer functions, and the mirror element 411 is shifted to an oscillation state oscillating between the ON side (i.e., +13 degrees) and OFF side (i.e., −13 degrees).

Then at t4, the mirror bit line voltage is raised to a voltage $V_{BH}$, and the mirror element 411 is thereby attracted to the OFF side.

Figure 31A:
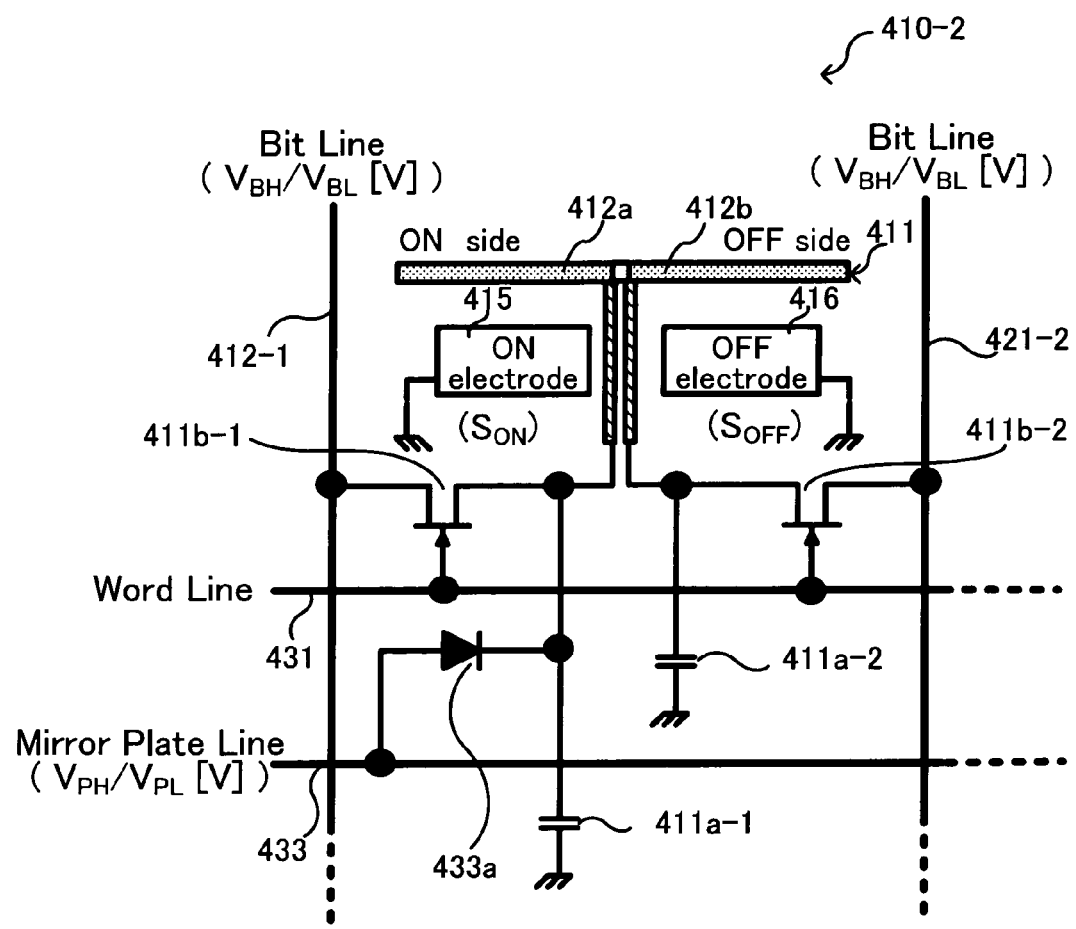
FIG. 31A is a cross sectional view for showing a circuit diagram of a pixel element configured with a diode-connecting the plate line to the pixel element shown in FIG. 29A for driving the ON side region of a mirror element.
Figure 31B:
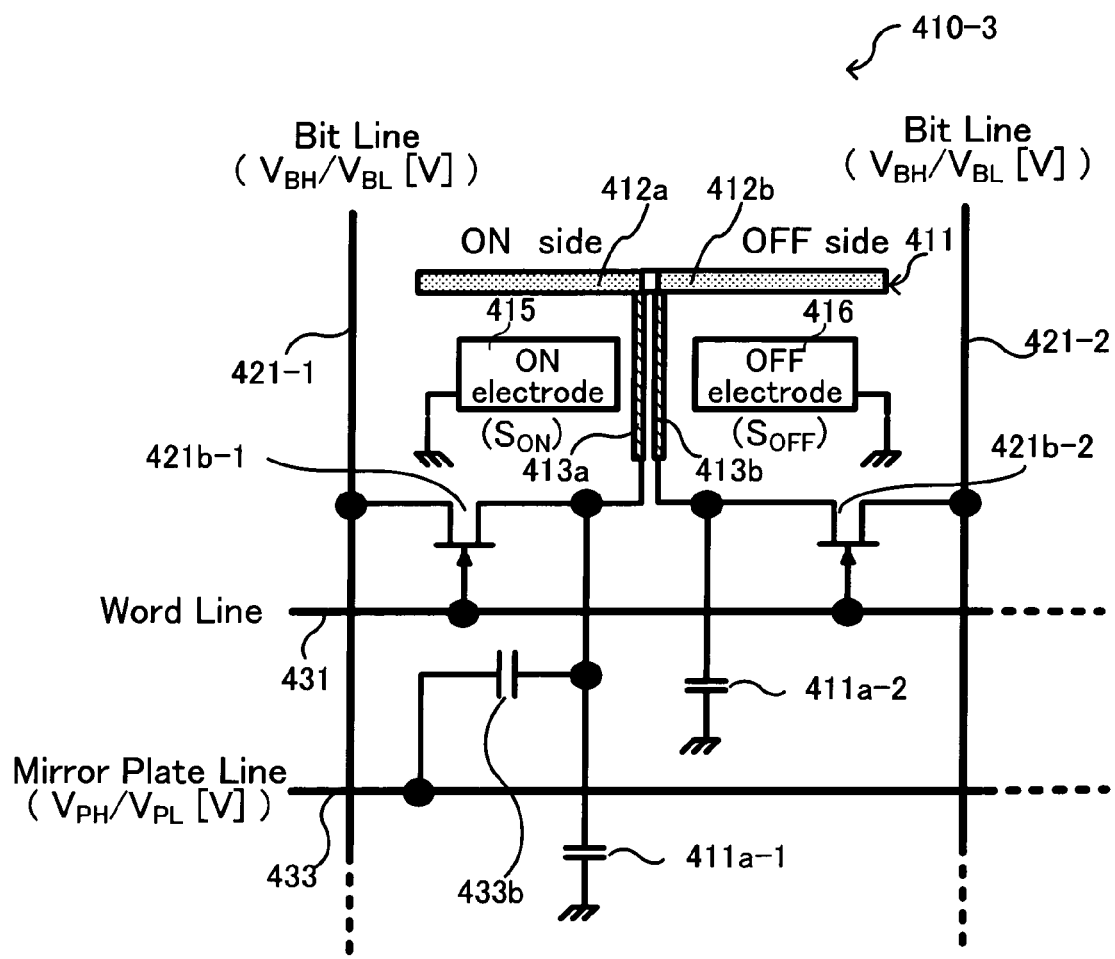
FIG. 31B is a cross sectional view for showing a circuit diagram of a pixel element with the plate line connected through a capacitor to the pixel element of FIG. 29A.

FIG. 31A is an outline diagram showing a pixel element 410-2 configured as connecting via diode the pixel element 410, as shown in FIG. 29A, to a mirror plate line 433, which is used for driving the ON-side region 412a of the mirror element 411. FIG. 31B is an outline diagram showing a pixel element 410-2 configured as connecting via capacitor the pixel element 411.

Figure 31C:
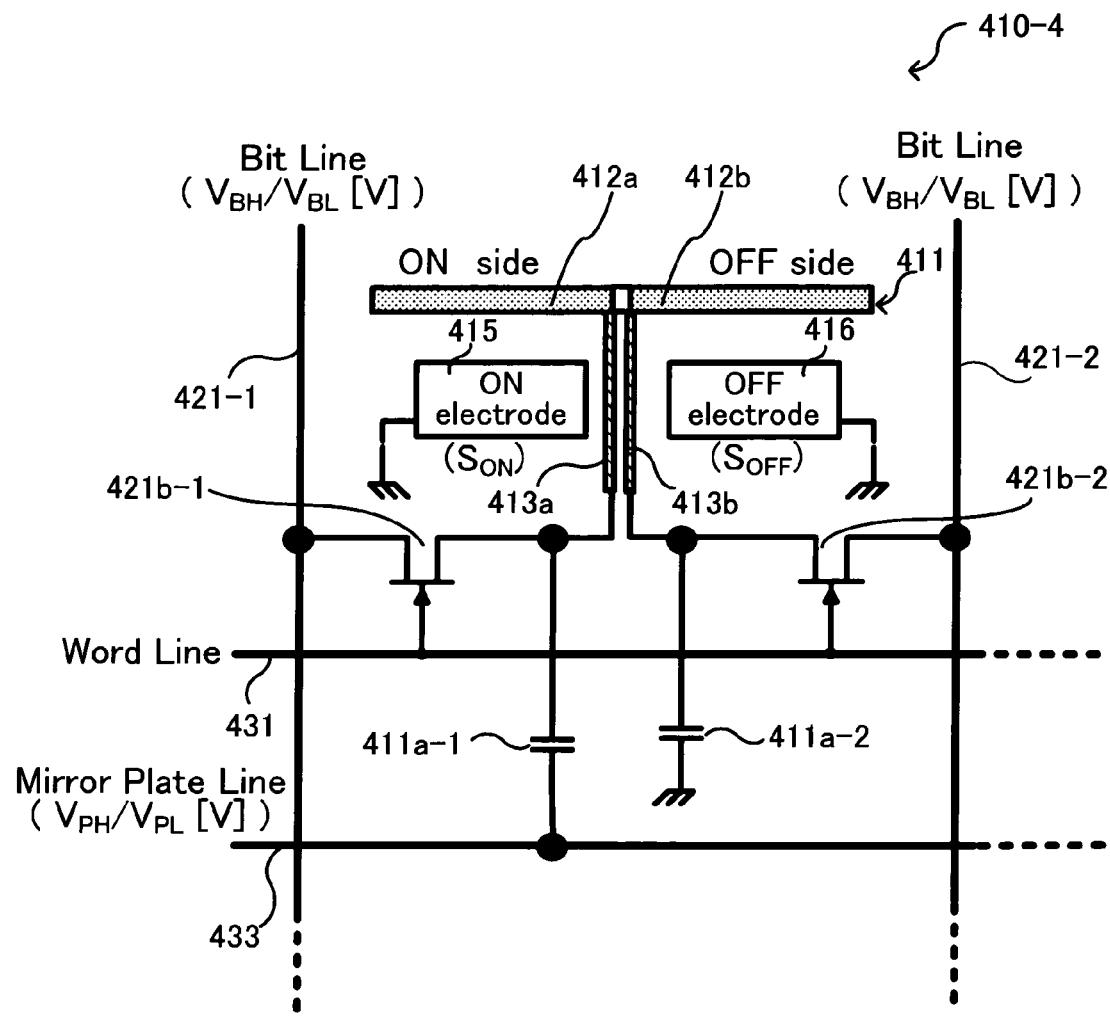
FIG. 31C is a cross sectional view for showing a circuit diagram of a pixel element replacing the two capacitors placed on the ON side, as shown in FIG. 31B, with a single capacitor.

FIG. 31C is an outline diagram showing a pixel element 410-4 replacing two capacitors placed on the ON side shown in FIG. 31B to a single capacitor. An ON-side capacitor 411a-1 shown in FIG. 31C is connected to a bit line 421-1, by way of a gate transistor 421b-1, and to the mirror plate line 433.

Figure 32:
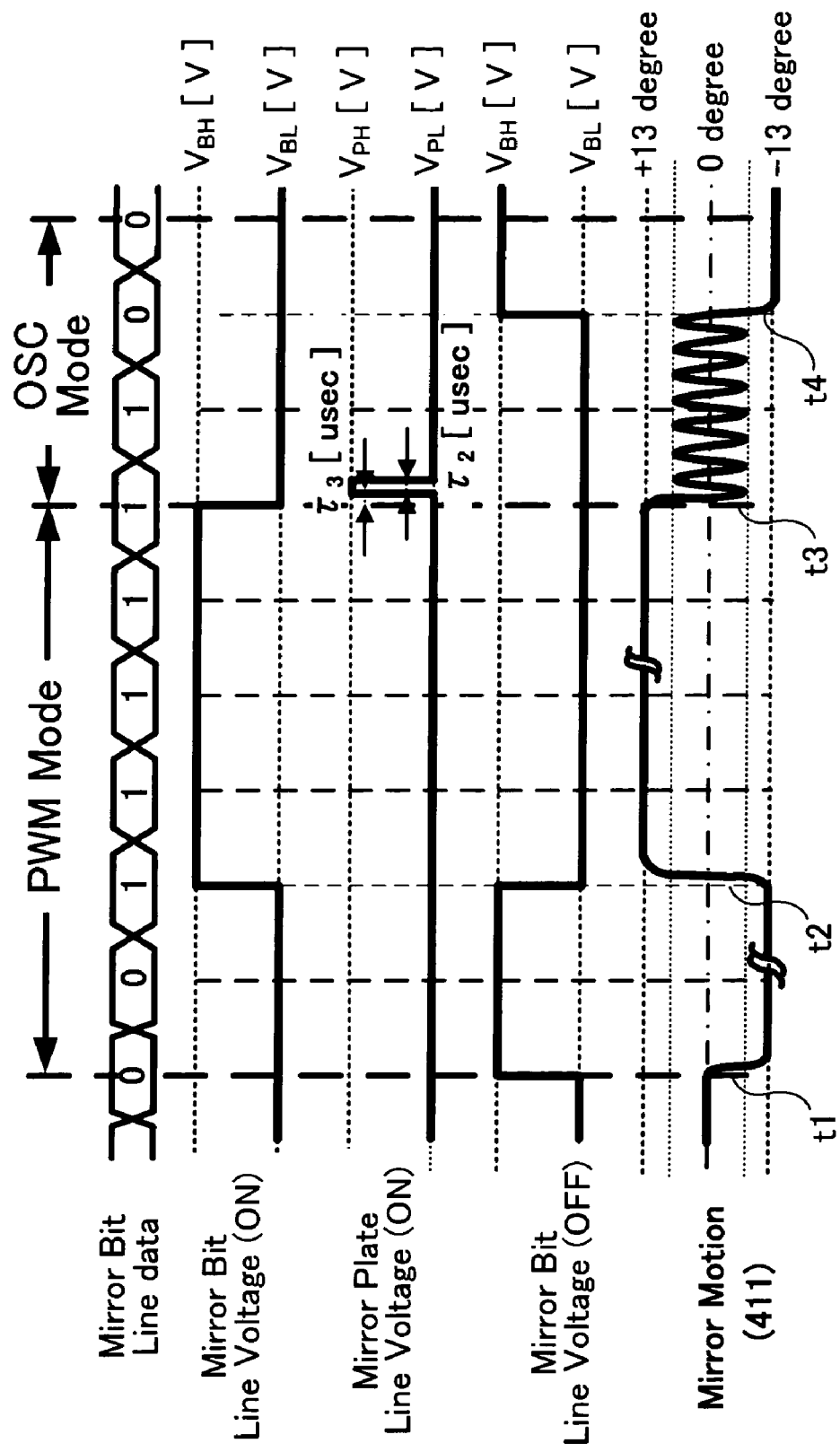
FIG. 32 is a timing diagram for showing the correlation between the operation timing of a pixel element shown in FIG. 31A and the behavior of a mirror element.

FIG. 32 is a time graph showing the correlation between the operation timing of a pixel element 410-3 shown in FIG. 31A and the behavior of the mirror element 411.

When a mirror bit line voltage $V_{BH}$ is applied to the OFF region 412b, with the mirror element 411 in the initial horizontal state (i.e., 0 degrees), the mirror element 411 is attracted by electrostatic force to the OFF side (i.e., −13 degrees) where the difference in potentials is large (at t1, which is the start point of a PWM control period).

Then, at t2, when the mirror bit line voltage is lowered to the GND level voltage $V_{BL}$ and the mirror bit line voltage of the ON side is raised to a voltage $V_{BH}$, the mirror element 411 is attracted to the ON side (i.e., +13 degrees) where the difference in potentials is large.

Then, when the period of time τ3 [μsec] has elapsed after the mirror bit line voltage is also lowered to the GND level voltage $V_{BL}$ at t3, which is the start point of an OSC control period, a mirror plate line voltage on the ON side is raised to a voltage $V_{PH}$ only for the period of time τ3 [μsec]. This operation causes the oscillation state of the mirror element 411 to be shifted to the above described intermediate oscillation. Minute adjustments of the volume of light are enabled by the intermediate oscillation of the mirror element 411.

Then, at t4, the mirror bit line voltage of the OFF side is raised to a voltage $V_{BH}$, and the mirror element 411 is thereby attracted to the OFF side.

More specifically, times τ2 and τ3 are basically determined by the resonance frequency of the hinge 413 and the applied voltage to the mirror element 411, and, if the electric conduction resistances of the hinge 413 and mirror element 411a are not substantially low, the aforementioned times are determined in consideration of these electrical conduction properties.

More specifically, the present invention may include embodiments in various manners possible and would be within the scope of the present invention. Although the present invention has been described by exemplifying the presently preferred embodiments, it shall be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as falling within the true spirit and scope of the invention.

What is claimed is:

1. A display device implemented with a spatial light modulator (SLM) comprising a plurality of pixel elements arranged in array to modulate incident light and display an image, wherein:
   each of the pixel elements comprises a movable electrode and a stationary electrode;
   a drive circuit comprises a memory cell connected to the movable electrode and receives image data for applying a voltage to control the movable electrode in accordance with image data, and a voltage application circuit for applying and controlling a voltage applied to the movable electrode or the stationary electrode to control a moving speed of the movable electrode.

2. The display device according to claim 1, wherein:
   the voltage application circuit is connected to the stationary electrodes of a plurality of the pixel elements.

3. The display device according to claim 2, wherein:
   the plurality of pixel elements connected to a voltage application circuit are disposed along a ROW direction.

4. The display device according to claim 2, wherein:
   a set of the stationary electrodes of the plurality of pixel elements comprise a combined electrode combined as one electrode.

5. The display device according to claim 1, wherein:
   the pixel element comprises a plurality of stationary electrodes and the voltage application circuit is connected to at least two of the stationary electrodes of the pixel element.

6. The display device according to claim 1, wherein:
   the voltage application circuit applies at least three different electric voltages to the stationary electrode.

7. The display device according to claim 1, wherein:
   the voltage application circuit applies a pulse of an intermittent voltage to the stationary electrode.

8. The display device according to claim 7, wherein:
a pulse width of the pulse of the intermediate voltage is smaller than a control period of the mirror electrode for displaying a minimum intensity of light defined a gray scale resolution.

9. A display device implemented with a spatial light modulator (SLM) comprising a plurality of pixel elements arranged in array to modulate an incident light and display an image, wherein:
each of the pixel elements comprises a movable electrode and at least a stationary electrode;
a drive circuit comprises a memory cell connected to the movable electrode and receives image data for applying a voltage applied to control the movable electrode in accordance with image data, and a voltage application circuit connected to the moveable electrode or stationary electrode for adjusting a voltage applied to the moveable electrode and the stationary electrode for preventing a sticking between the movable electrode and the stationary electrode.

10. The display device according to claim 9, wherein:
the voltage application circuit is connected to the stationary electrodes of a plurality of the pixel elements.

11. The display device according to claim 10, wherein:
the plurality of pixel elements connected to a voltage application circuit are disposed along a ROW direction.

12. The display device according to claim 10, wherein:
a set of the stationary electrodes of the plurality of pixel elements comprise a combined electrode combined as one electrode.

13. The display device according to claim 9, wherein:
the pixel element comprises a plurality of stationary electrodes; and
the voltage application circuit is connected to at least two of the stationary electrodes of the pixel element.

14. The display device according to claim 9, wherein:
the voltage application circuit applies at least three different electric voltages to the stationary electrode.

15. The display device according to claim 9, wherein:
the voltage application circuit applies a pulse of an intermittent voltage to the stationary electrode.

16. The display device according to claim 15, wherein:
a pulse width of the pulse of the intermediate voltage is smaller than a control period of the movable electrode for displaying a minimum intensity of light defined a gray scale resolution.

17. The display device according to claim 9, wherein:
the voltage application circuit control at least a voltage applied to either the movable electrode or the stationary electrode to decrease a voltage different between the movable electrode and stationary electrode during at least a part of a frame cycle period for when holding the movable electrode at a fixed deflection angle.

18. A micromirror device implemented with a spatial light modulator (SLM) comprising a plurality of mirror elements arranged in an array to deflect an incident light for displaying an image, wherein:
each of the mirror elements comprises a mirror electrode and two stationary electrodes disposed on both sides of a deflection axis of the mirror electrode
an elastic hinge for supporting and deflecting the mirror electrode, a drive circuit comprises a memory cell connected to a mirror electrode through the elastic hinge wherein the drive circuit comprises the memory cell receives image data to apply and control a voltage applied to the mirror electrode; and
a voltage application circuit for controlling a voltage applied to the mirror electrode or the stationary electrode for generating an imbalanced electrostatic force between each stationary electrode and mirror electrode.

19. The micromirror device according to claim 18, wherein:
each of the mirror elements comprises a second voltage application circuit for independently applying and controlling a voltage to the mirror electrode.

20. The micromirror device according to claim 19, wherein:
the second voltage application circuit controls and adjusts the deflection states of the mirror electrode by controlling a voltage applied to the mirror electrode.

21. The micromirror device according to claim 18, wherein:
The voltage application circuit further controls the mirror electrode to operate in at least an oscillation state with the mirror electrode oscillates.

22. The micromirror device according to claim 19, wherein:
the second voltage application circuit applies at least three different electric voltages to the stationary electrode.

23. The micromirror device according to claim 19, wherein:
the second voltage application circuit applies a pulse of voltage to the mirror electrode.

24. The micromirror device according to claim 23, wherein:
a pulse width of the pulse of the intermediate voltage is smaller than a control period of the mirror electrode for displaying a minimum intensity of light defined a gray scale resolution.

25. A micro electromechanical system (MEMS)device implemented with a spatial light modulator (SLM) comprising a plurality of pixel elements arranged in an array to modulate an incident light for displaying an image, wherein:
each of the pixel elements comprises a moveable electrode and a stationary electrode;
a drive circuit comprises a memory cell connected to the moveable electrode and receives image data for applying a voltage to control the moveable electrode in accordance with the image data; and
a voltage application circuit for applying and controlling a voltage applied to the moveable electrode or the stationary electrode.

* * * * *